United States Patent
Spence et al.

(10) Patent No.: US 6,324,532 B1
(45) Date of Patent: Nov. 27, 2001

(54) METHOD AND APPARATUS FOR TRAINING A NEURAL NETWORK TO DETECT OBJECTS IN AN IMAGE

(75) Inventors: Clay Douglas Spence, Princeton Junction; Paul Sajda, Princeton, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/464,506

(22) Filed: Dec. 15, 1999

Related U.S. Application Data

(63) Continuation-in-part of application No. 08/797,497, filed on Feb. 7, 1997, now Pat. No. 6,018,728.
(60) Provisional application No. 60/112,486, filed on Dec. 16, 1998.

(51) Int. Cl.$^7$ .............................. G06F 15/18; G06G 7/00
(52) U.S. Cl. ............................................. 706/27; 706/19
(58) Field of Search .................................. 706/27, 19

(56) References Cited

U.S. PATENT DOCUMENTS

| | | | |
|---|---|---|---|
| 4,858,147 | * 8/1989 | Conwell | 706/19 |
| 5,048,097 | 9/1991 | Gaborski et al. | 706/20 |
| 5,052,043 | 9/1991 | Gaborski | 706/25 |
| 5,155,801 | 10/1992 | Lincoln | 395/22 |
| 5,179,441 | 1/1993 | Anderson et al. | 348/43 |
| 5,222,195 | 6/1993 | Alkon et al. | 706/25 |
| 5,260,871 | 11/1993 | Goldberg | 364/413.02 |
| 5,301,681 | 4/1994 | DeBan et al. | 128/736 |
| 5,331,550 | 7/1994 | Stafford et al. | 364/413.02 |
| 5,345,539 | 9/1994 | Webb | 706/24 |
| 5,384,895 | 1/1995 | Rogers et al. | 395/23 |
| 5,444,796 | 8/1995 | Ornstein | 382/157 |
| 5,463,548 | * 10/1995 | Asada et al. | 364/413.02 |
| 5,479,576 | 12/1995 | Watanabe et al. | 395/23 |
| 5,491,627 | 2/1996 | Zhang et al. | 364/413.2 |
| 5,554,273 | 9/1996 | Demmin et al. | 205/785 |
| 5,572,596 | 11/1996 | Wildes et al. | 382/117 |
| 5,729,631 | 3/1998 | Wober et al. | 382/232 |
| 5,737,716 | * 4/1998 | Bergstrom et al. | 704/202 |
| 5,740,326 | * 4/1998 | Boulet et al. | 706/27 |
| 6,021,369 | * 2/2000 | Kamihira et al. | 701/102 |

FOREIGN PATENT DOCUMENTS

WO 97/29437 * 8/1997 (WO).

OTHER PUBLICATIONS

Manuela S. Pereira et al. Hierarchical Neural Network For Multiresolution Image Analysis IEEE 1996, pp. 261–264.
Siegfried Bos et al. Using Weight Decay to Optimize the Generalization Ability of a Perceptron, IEEE 1996, pp. 241–246.
D. J. Burr et al. Hierarchical Recurrent Networks For Learning Musical Structure, IEEE 1993, pp. 216–225.
D.H. Ballard, "Modular Learning in Neural Networks" Proc. AAAI–87 Sixth National Conference on Artificial Intelligence, vol. 1 pp. 279–284.
M.R. Evans et al. "A Multi–Resolution Neural Network Classifier for Machine Vision" IEEE International Conference on Neural Networks, pp. 2594–2599, 1991.
T. Fechner and R. Tanger "A Hybrid Neural Network Architecture for Automatic Object Recognition" Neural Networks for Signal Processing IV, pp. 187–194.

(List continued on next page.)

Primary Examiner—George B. Davis
(74) Attorney, Agent, or Firm—William J. Burke

(57) ABSTRACT

A signal processing apparatus and concomitant method for learning and integrating features from multiple resolutions for detecting and/or classifying objects. The signal processing apparatus comprises a hierarchical pyramid of neural networks (HPNN) having a "fine-to-coarse" structure or a combination of the "fine-to-coarse" and the "coarse-to-fine" structures.

3 Claims, 8 Drawing Sheets

OTHER PUBLICATIONS

C–H Chen et al. "Analysis of Decision Boundaries Generated by Constructive Neural Network Learning Algorithms" World Congress on Neural Networks '95, vol. 1, pp. 628–635.

D. S Chen and R. C. Jain "A Robust Back Propagation Learning Algorithm for Function Approximation" IEEE Trans. on Neural Networks, vol. 5(3), pp. 467–479.

Spence et al. "Neural Network/Pyramid Architectures that Learn Target Context", Image Understanding Workshop, (DARPA) Defense Advance Research Project Agency, 1994.

P. Sajda, C. Spence, J. Pearson, "A Hierarchical Neural Network Architecture that Learns Target Context: Applications to Digital Mammography", International Conference on Image Processing (ICIP), Oct. 1995.

C. Spence, J. Pearson, J. Bergen, "Coarse–to–Fine Image Search Using Neural Networks" Advances in Neural Information Processing Systems 7, The MIT Press, copyright 1995.

P. Anandan, Peter J. Burt, John C. Pearson, Clay D. Spence, "Hybrid Pyramid/Neural Network Object Recognition" Applied Imagery Pattern Recognition (AIPR), 1993.

Copy of International Search Report dated Jun. 2, 1997, from corresponding inaternational application PCT/US97/02216.

Xing et al., "Pyramid Neural Networks for Mammogram Tumor Pattern Recognition", IEEE 1994 International Conference on Neural Networks, vol. 6, pp. 3546–3551.

Zheng et al. "Multistage Neural Network for Pattern Recognition in Mammogram Screening" 1994 IEEE International Conference on Neural Networks, vol. 6, pp. 3437–3441.

* cited by examiner

METHOD AND APPARATUS FOR TRAINING A NEURAL NETWORK TO DETECT OBJECTS IN AN IMAGE

This application is a continuation-in-part of U.S. application Ser. No. 08/797,497, filed on Feb. 7, 1997, which is herein incorporated by reference now U.S. Pat. No. 6,018,728.

This application claims the benefit of U.S. Provisional Application No. 60/112,486 filed Dec. 16, 1998, which is herein incorporated by reference.

This invention was made with U.S. government support under contract number NROXXX-96-G-3006. The U.S. government has certain rights in this invention.

The present invention relates generally to the field of neural information processing and, more particularly, to a hierarchical apparatus and concomitant method for learning and integrating features from multiple resolutions for detecting and/or classifying objects, especially larger objects.

BACKGROUND OF THE INVENTION

Neural network modeling has been developed to solve problems ranging from natural language understanding to visual processing. A neural network is a computational model composed of neurons (also known as nodes, units or perceptrons) and connections between the nodes. The strength of each connection is expressed by a numerical value called a weight, which can be modified. The activation of a given node is based on the activations of the nodes that have connections directed at that node and the weights on those connections.

In contrast to conventional computers, which are programmed to perform specific tasks, most neural networks do not follow rigidly programmed rules and are generally taught or trained. Generally, feed-forward neural network can be implemented as functions y(f,w) of a vector f of inputs and a weight or parameter vector w. The weight vector is modified such that the neural network optimally estimates some quantity that depends on f. The process of adjusting w is commonly referred to as training, where the methods for training are referred to as training algorithms. Most neural network trainings involve the use of an error function. The weight vector is adjusted so as to minimize the sum of average of the error function on a set of training samples. A penalty term is generally applied to the error to restrict the weight vector in some manner that is thought desirable. Given the resulting objective function, various training methods are used to minimized it or involve the use of some form of gradient descent.

For instance, in image analysis a digital photographic image can be introduced to a neural network for identification, and it will activate the relevant nodes for producing the correct answer based on its training. Connections between individual nodes are "strengthened" (resistance turned down) when a task is performed correctly and "weakened" (resistance turned up) if performed incorrectly. In this manner a neural network is trained and provides more accurate output with each repetition of a task.

The field of image analysis is well-suited for computer-assisted search using neural network. Generally, images contain a vast quantity of information where only a small fraction of the information is relevant to a given task. The process of identifying the relevant fraction from the vast quantity of information often challenges the capabilities of powerful computers. Although neural networks have demonstrated its flexibility as pattern-recognition apparatus for detecting relevant information from images, they scale poorly with the size of the images. As the size of the image and neural network increases, the computational expense and training time may become prohibitive for many applications.

For example, radiologists are faced with the difficult task of analyzing large quantities of mammograms to detect subtle cues to breast cancer which may include the detection of microcalcifications. A difficult problem is the detection of small target objects in large images. The problem is challenging because searching a large image is computationally expensive and small targets on the order of a few pixels in size have relatively few distinctive features which enable them to be identified from "non-targets".

A second problem is the need for using real data (training samples) to train a neural network to detect and classify objects. Such real data will almost inevitably contain errors, thereby distorting the conditional probability that an input vector came from an instance of the class that a neural network is designed to detect or from a specific position on the image.

Therefore, a need exists in the art for a method and apparatus for automatically learning and integrating features from multiple resolutions for detecting and/or classifying objects. Additionally, a need exists in the art for a supervised learning method that addresses errors in the training data.

SUMMARY OF THE INVENTION

A signal processing apparatus and concomitant method for learning and integrating features from multiple resolutions for detecting and/or classifying objects are presented. Specifically, the signal processing apparatus comprises a hierarchical pyramid of neural networks (HPNN). In one embodiment, the HPNN has a "fine-to-coarse" structure. In an alternative embodiment, the HPNN has a network architecture is a combination of the "fine-to-coarse" HPNN and the "coarse-to-fine" HPNN. These HPNNs are robust in detecting target objects that may be relatively large in size when compared to the size of a region of interest (ROI).

An objective function and various associated regularizer embodiments are also presented to train the neural networks to detect sub-patterns of features of some class of objects. These training methods are useful in training a plurality of neural networks that are organized into a hierarchical relationship such as the HPNN. Additionally, these training methods are useful in training a plurality of neural networks that have multiple outputs.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
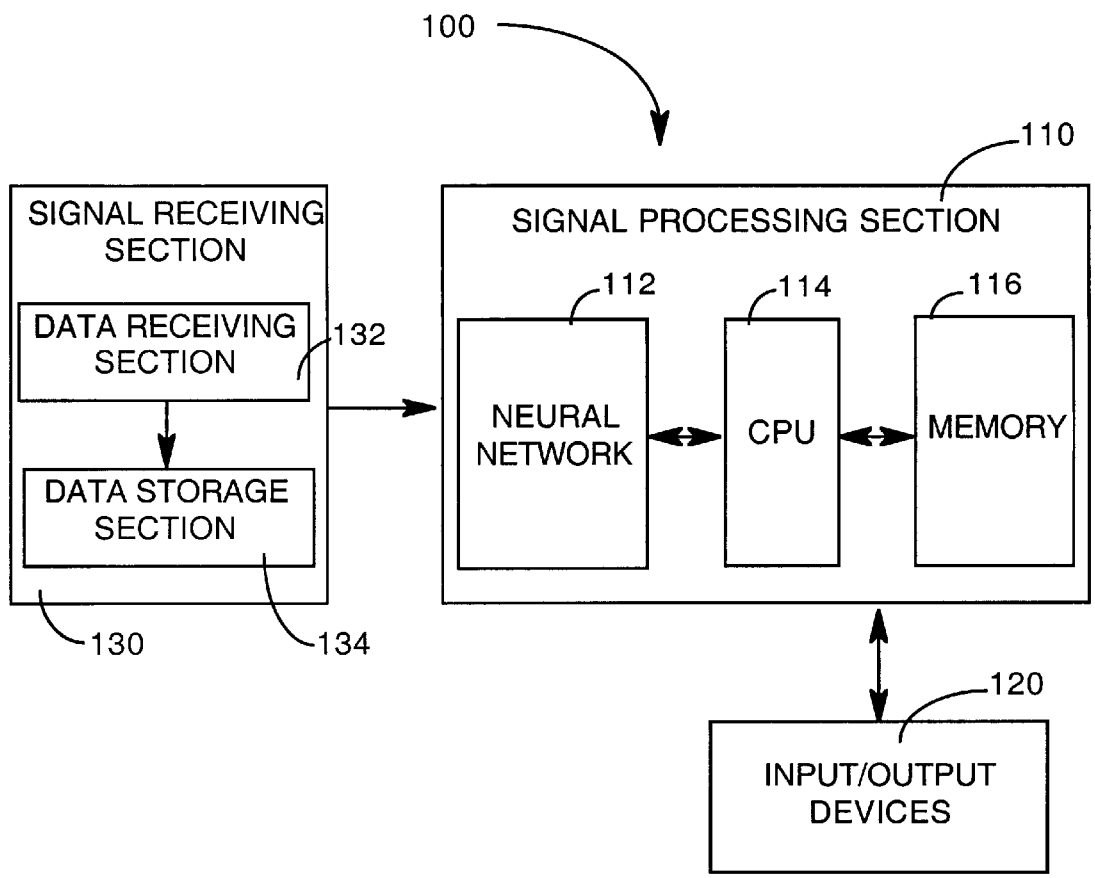
FIG. 1 is a block diagram of a signal processing system that incorporates a neural network that embodies the teachings of the present invention.

FIG. 1 depicts a signal processing system 100 that utilizes the present inventions. The signal processing system consists of a signal receiving section 130, a signal processing section 110 and input/output devices 120.

Signal receiving section 130 serves to receive input data signals, such as images from, including by not limited to, aerial imagery or medical imaging devices. Signal receiving section 130 includes a data receiving section 132 and a data storage section 134. Data receiving section 130 may include a number of devices such as a modem and an analog-to-digital converter. A modem is a well-known device that comprises a modulator and a demodulator for sending and receiving binary data over a telephone line, while an analog-to-digital converter converts analog signals into a digital form. Hence, signal receiving section 130 may receive input signals "on-line" and, if necessary, convert them to a digital form from a number of devices such as a computer, a camera, a video player/decoder or various imaging devices, e.g., medical devices. In fact, the input signals is not limited to images and may comprise any data that has a "natural scale", e.g., drug discovery data (molecular data in general) and speech data.

The data storage section 134 serves to store input signals received by data receiving section 132. Data storage section 134 may incorporate a number of devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having at least one neural network 112, at least one central processing unit (CPU) 114 and a memory 116 for processing images. The neural network 112 can be a physical device constructed from various filters and/or processors which is coupled to the CPU through a communication channel. Alternatively, the neural network can be represented by a software implementation residing in the memory of the signal processing section.

The signal processing section 110 is also coupled to a plurality of input and output devices 120 such as a keyboard, a mouse, a video monitor or storage devices, including but not limited to, a hard disk drive, a floppy drive or a compact disk drive. The input devices serve to provide inputs (e.g., data, commands and software applications) to the signal processing section for processing the input images, while the output devices serve to display or record the results.

Each neural network 112 includes at least an input layer, an output layer and optional intermediate layers (also known as hidden layers). Each layer includes at least one node. The neural network undergoes supervised training in accordance with the methods described below. The trained neural network is then applied to an input image for detecting and/or classifying a target object.

The CPU 114 of the signal processing section performs various signal processing functions, including but not limited to, preprocessing the input images (e.g., constructing an image pyramid for each input image), training the neural network, processing the output signal from the neural network and growing pattern trees as discussed below.

Figure 2:
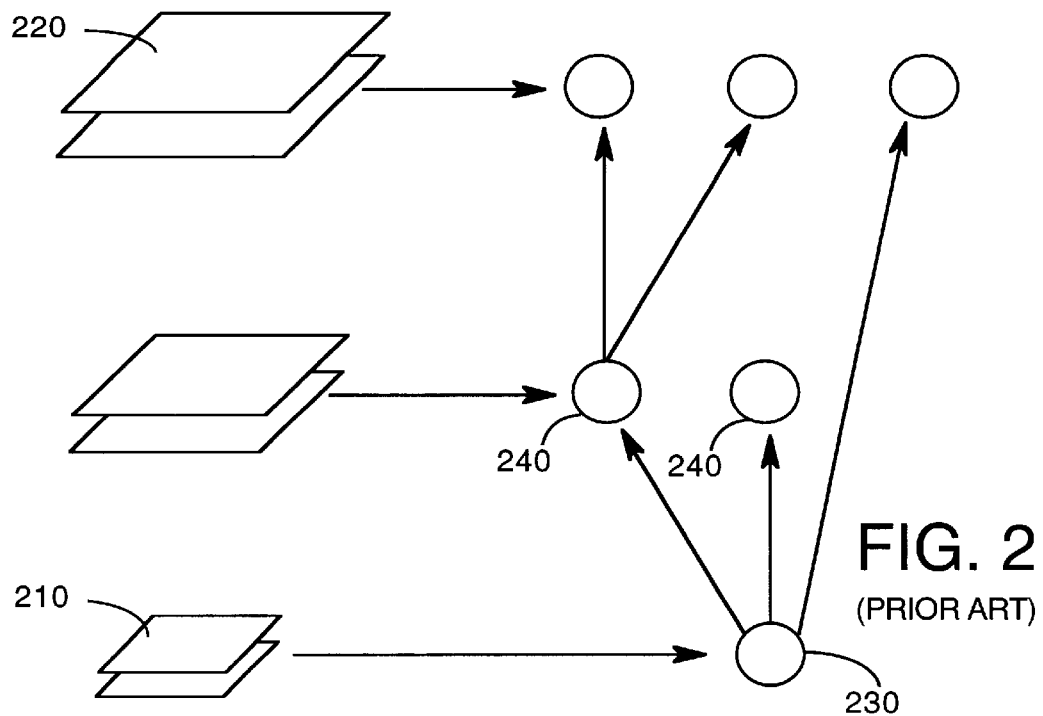
FIG. 2 illustrates a pattern tree for describing objects in terms of simple sub-patterns.

The present invention addresses the poor scaling property of a neural network by applying the well known concept of "pattern trees" which are tree-structured descriptions of objects in terms of simple sub-patterns as illustrated in FIG. 2. Each node of the tree is a small template which matches some piece of the object at some resolution. Levels (210 . . . 220) in the pattern tree represent resolution, typically equivalent to pyramid level, with the root or top node 230 matching the overall appearance of the desired object at the lowest usable resolution 210. The top node's children 240 represent the appearance of pieces of the object, where these children's children represent sub-pieces of the pieces, and so on.

In the present invention, by attempting to detect sub-patterns rather than the entire object, the detection of the object is divided into simpler tasks. Namely, combining the pattern-tree approach with neural networks creates a method of detecting relatively complex objects by using collections of simple networks. Generally, there are sub-patterns for each of several scales, so that multi-resolution techniques such as coarse-to-fine search can be used to search for objects. In addition, matches can be verified or falsified based on subsets of the entire pattern tree, potentially improving efficiency. Partially occluded objects can be recognized by matches of parts of their pattern tree, even if matches to the larger-scale parts are poor. For example, searching for camouflaged objects can be accomplished by looking for appropriate matches to the fine-scale features first.

Specifically, the present invention trains several neural networks to detect different features, incrementally integrating these features using other networks, with a final network producing the overall estimate of the probability for an object of interest (OOI). Namely, the pattern tree grows from the root to the leaves and integrates the outputs of the networks to produce an overall estimate of the probability that an object of interest is present.

A principled objective function is also used to train the individual neural networks to detect sub-patterns or features of some class of objects. The present invention learns the sub-pattern, rather than being informed as to what is the pattern, its location, in which examples of the objects it occurs, or even the probability of it occurring in an object. Each feature-detection network learns a pattern which is most useful for distinguishing this class of objects from other objects, although the pattern does not have to appear in every example of the object of interest. The objective function of the present invention differs significantly from the traditional neural network error functions, which are designed to measure how likely the network is to reproduce the training data.

Figure 3:
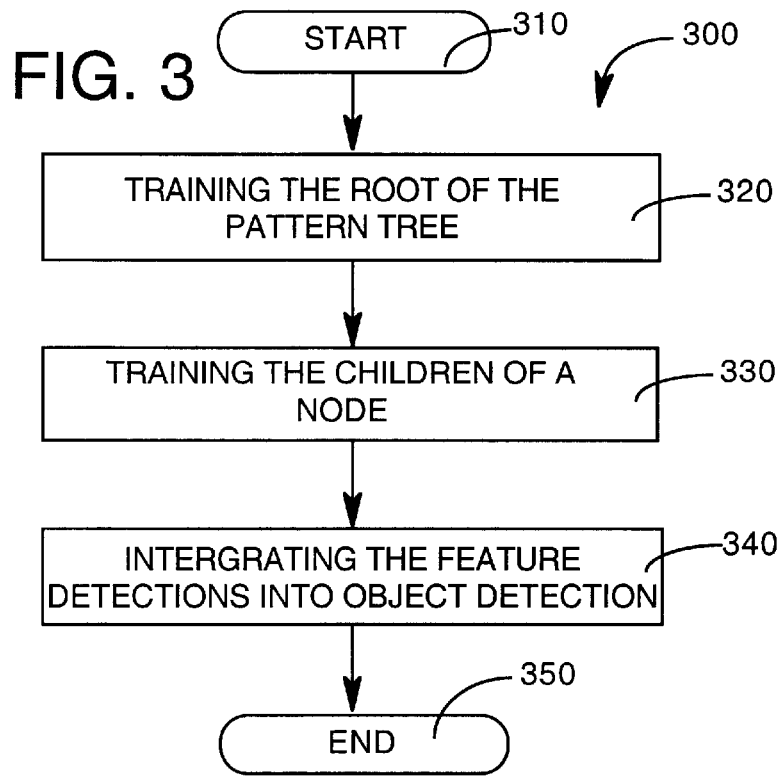
FIG. 3 illustrates a method for learning pattern trees.

FIG. 3 illustrates a method 300 for learning pattern trees. Namely, FIG. 3 illustrates a method for training and determining the structure/architecture a plurality of neural networks to detect a feature or sub-feature which is useful for distinguishing between objects of the desired class from other objects without having to specify the feature, i.e., each neural network "discovers" the feature during training. A pattern tree will typically have its root node represent the overall appearance of the object at low resolution, e.g., a pattern tree for faces might have a root node that represents small face-shaped blobs.

Referring to FIG. 3, the method begins in step 310 and proceeds to step 320 where the method trains the root of the pattern tree. The training of a neural network to detect such patterns is similar to the usual procedure for training a neural network to detect objects in an image. It may be undesirable to try to force the neural network to respond at all positions within the objects at low-resolution, and it may be difficult or at least tedious to specify exactly which pixels are contained in the objects. In one embodiment, the error function for training the root node is the uncertain-object-position objective of equation 9 as discussed below. In a second embodiment, for learning the appearance of different poses of the object, the "Feature Discovery" objective of equation 2 below can be used so that one neural network would not have to learn all poses. However, other appropriate error functions can be used to train the root node.

All networks in the present invention are used in the same way, where the network is applied to each pixel in an image or region of an image, one pixel at a time. The inputs to the network are features derived from the image at that location. These features may be chosen features, such as oriented energies in some frequency bands, or they may have been derived by another network.

In step 330, the method 300 trains the children nodes. Each of the neural networks is trained with different random starting weight vectors. The neural networks are trained in all of each region occupied by an object, or they may be trained in some region defined by the output of the network in the parent node. These trainings serve to promote the child networks in learning sub-features of the parent's feature.

In one embodiment, there is nothing to encourage the child networks to learn the sub-features. Since the goal is to have the child networks learn sub-features of the parent's features, the method simply provides the child networks with the parent network's output or the outputs of its hidden units, suitably up-sampled since the parent's pattern is at a lower resolution. This would at least provide the child networks with information about the coarser-scale feature.

In another embodiment, some region in the image would be defined by locating all pixels at which the parent network's output is above some threshold. This region is expanded slightly, since the parent node may respond only in a restricted region of some feature. This expansion permits the children to learn sub-features of the entire parent feature.

It is desirable for the network to learn to detect some feature which is maximally helpful for distinguishing objects of this class from other objects. The network will be trained on all examples of the object and on negative examples. However, it is not desirable to insist that the feature occurs in all examples of the object, but if it never occurs, the feature is very uninformative. Thus, the present invention trains the neural networks using an objective function called "Feature-Discovery" which prefers features which occur fairly frequently in the examples of the class, but does not punish the network too much for examples in which the feature does not occur.

More specifically, the probability that a pixel is in an object from the class of interest is maximized, if the network generates a detection at that pixel. Unlike the conventional case, the probability of being in an object given a detection is not determined by the training data. Instead, a distribution for it from the training data is computed and the mean value of this distribution is used as our performance criterion.

Let the output of the network at position x be y(x). Denote the symbol o ($\bar{o}$) that an object is (is not) present at whatever pixel that are currently being considered. Denote by d ($\bar{d}$) that the network has (has not) detected a pattern at the current pixel. The probability of being in an object from the class of interest given a detection is Pr(o|d), which can be referred to as $p_{o|d}$. For a given parameter vector, set of input images, and knowledge of the locations of the objects in the image, the sets of network outputs $Y_{Pos}$ on the positive positions and $Y_{Neg}$ on the negative positions can be computed. The probability distribution for $p_{o|d}$ can be marginalized over the number of detections $n_{od}$ in positive examples of the desired object class and the number of detections $n_{\bar{o}d}$ in negative examples. Thus, the expected value of $p_{o|d}$ is:

$$\bar{p}_{o|d} \equiv E(p_{o|d} \mid Y_{Pos}, Y_{Neg}) \qquad (1)$$
$$= \sum_{n_{od}, n_{\bar{o}d}} E(p_{o|d} \mid n_{od}, n_{\bar{o}d})$$
$$\Pr(n_{od}, n_{\bar{o}d} \mid Y_{Pos}, Y_{Neg})$$

The expression in equation 1 can be evaluated exactly since the factors in each term in the sum are well-defined, given a prior for $p_{o|d}$. Thus, equation 1 is computed with respect to the network's parameters to produce the expression:

$$\bar{p}_{o|d} = \int_0^1 (1-u) \left( 2\frac{n_o}{N} + \sum_{x \in X_{Pos}} \frac{(1-u)y(x)}{1 - uy(x)} \right) \times \qquad (2)$$
$$\prod_{All\, x} (1 - uy(x)) du$$

where N is the total number of pixels, $n_o$ is the number of pixels inside of the object. (The bar here indicates the mean and not negations as above.) The negative logarithm of equation 2 is the Feature-Discovery (FD) objective function ($E_{FD}$). Typically, in training a neural network, the weights are adjusted to minimize the negative logarithm of a probability, rather than maximizing the probability directly. However, those skilled in the art will realize that given a probability, neural network training can be implemented in different manners.

The gradient of $\bar{p}_{o|d}$ with respect to a weight $w_a$ is:

$$\frac{\partial \bar{p}_{o|d}}{\partial w_a} = \int_0^1 (1-u) \left( \prod_{All\, x} (1 - uy(x)) \right) \times \qquad (3)$$
$$\left\{ \sum_{x \in X_{Pos}} \frac{1-u}{(1-uy(x))^2} \frac{\partial y}{\partial w_a}(x) - \right.$$
$$\left( 2\frac{n_0}{N} + \sum_{x \in X_{Pos}} \frac{(1-u)y(x)}{1 - uy(x)} \right) \times$$
$$\left. \sum_{All\, x} \frac{u}{1 - uy(x)} \frac{\partial y}{\partial w_a}(x) \right\} du$$

However, solving equation 2 is computationally expensive. Alternatively, if $n_{od} \gg 1$, a good approximation should be $p_{o|d} \approx n_{od}/n_d$, the number of detections in objects divided by the total number of detections. By using the mean values of $n_{od}$ and $n_d$ and applying offsets a, b to both numerator and denominator, where $a=2n_0/N$ and $b=2$, an approximation to $\bar{p}_{o|d}$ is achieved. The negative logarithm of this approximation is used as the "Approximate Feature-Discovery" (AFD) objective function:

$$E_{AFD} = -\log\left(\frac{2n_0}{N} + \sum_{x \in X_{Pos}} y(x)\right) + \log\left(2 + \sum_{All\,x} y(x)\right) \quad (4)$$

Even though equation 4 is derived from an exact expression of $\bar{p}_{o|d}$, that exact expression was derived using a choice of prior, so the terms $2n_0/N$ and 2 are not the only possibilities. For the purpose of training, the gradient of equation 4 with respect to the network parameters is:

$$\frac{\partial E_{AFD}}{\partial w_a} = -\frac{\sum_{x \in X_{Pos}} \partial y(x)/\partial w_a}{2n_0/N + \sum_{x \in X_{Pos}} y(x)} + \frac{\sum_{All\,x} \partial y(x)/\partial w_a}{2 + \sum_{All\,x} y(x)} \quad (5)$$

Because these objective functions use the number of pixels detected in the positive regions and in total, the network is rewarded for detecting more than one pixel within an object.

Alternatively, it would be preferable if the neural network was rewarded for detecting pixels in different objects. To achieve this result, the detection of pixels is replaced with the detection of regions. For the negative pixels, those parts of the image whose size is typical of the objects being detected are divided into "blobs". In a coarse-to-fine search system, at resolutions other than the lowest, negative regions are defined by the detections of the network at the next-lower-resolution. If these regions are large, it may be useful to divide them into smaller regions.

The probability of detecting a region is just the probability of detecting at least one pixel within the region. This is one minus the probability of not detecting any of the pixels, or $z_i = 1 - \Pi_{x \in Blob_i}(1-y(x))$. Thus, the blob-wise AFD objective is:

$$E_{AFD} = -\log\left(\frac{2n_{pb}}{N_b} + \sum_{Positive\,i} z_i\right) + \log\left(2 + \sum_{All\,blobs\,i} z_i\right) \quad (6)$$

where $n_{pb}$ is the number of positive blobs in the training data and $N_b$ is the total number of blobs in the training data. The gradient of equation 6 with respect to a weight is:

$$\frac{\partial E_{AFD}}{\partial w_a} = -\frac{\sum_{Positives\,i} \sum_{x \in Blob_i} y(x) \partial a(x)/\partial w_a}{2n_{pb}/N_b + \sum_{Positives\,i} z_i} + \frac{\sum_{All\,Blobs\,i} \sum_{x \in Blob_i} y(x) \partial a(x)/\partial w_a}{2 + \sum_{All\,Blobs\,i} z_i} \quad (7)$$

The initial number of children to train for a given node in the tree is approximately 10. This number can be altered by pruning out those networks which are redundant or perform poorly.

Thus, method 300 learns the pattern tree by first training the root and then training children of the root at the next-higher resolution. For each child, the method then trains children for it, and so on at successively higher resolutions, until the method has found sub-features at the highest resolution available.

Figure 4:
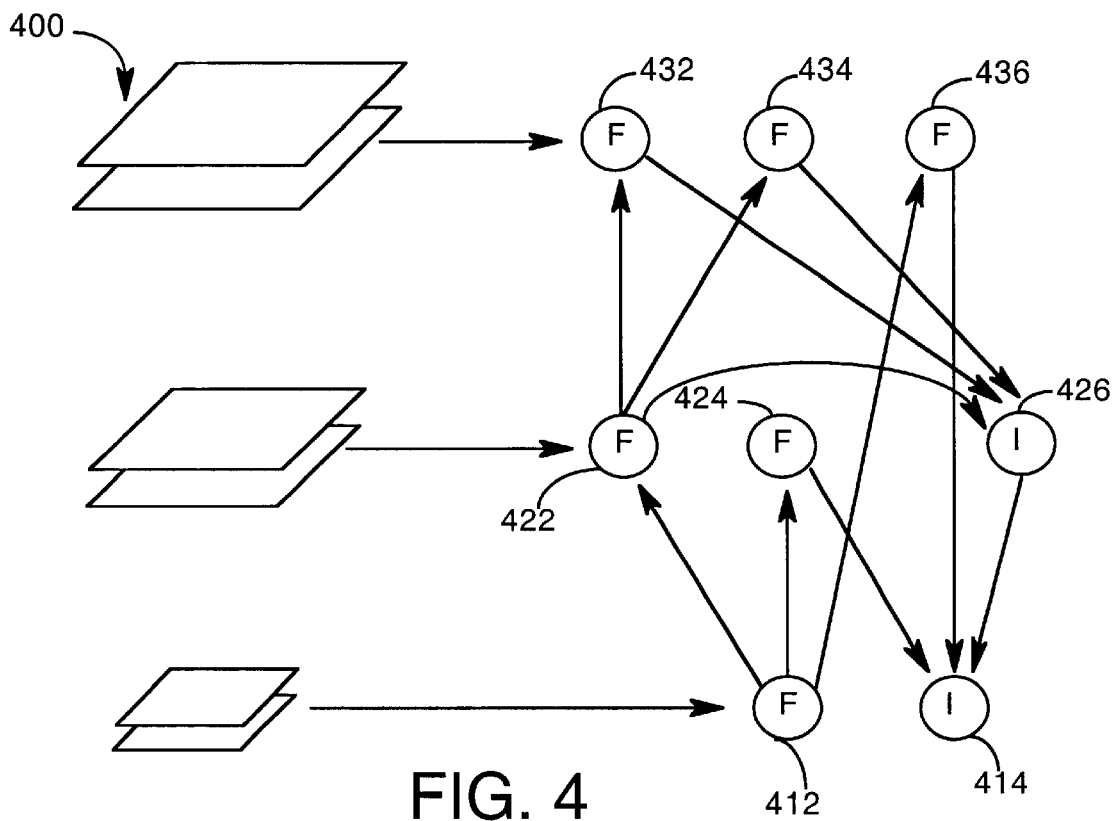
FIG. 4 illustrates a pattern tree with a "tree-mirroring" structure.

In step 340, method 300 integrates feature detection into object detection. Method 300 creates or grows a pattern tree having a particular "tree-mirroring" structure as illustrated in FIG. 4. Referring to FIG. 4, the tree-mirroring structure contains "feature" (F) networks 412, 422, 424, 432, 434 and 436, which have already been trained to detect sub-patterns of the objects. The tree-mirroring structure also contains integration networks (I) 414 and 426, which have the outputs of other networks for their inputs. For each feature network with children, a single corresponding or "mirror" integration network is added which receives inputs from the children of its mirror feature network and also input from that mirror feature network. It should be noted that, at most, only one integration network is added to each level or resolution as shown in FIG. 4. For example, integration neural network 426 receives inputs from feature neural networks 422, 432 and 434.

However, if a feature network has children which themselves have children, i.e., which are not leaves of the tree, then this feature network's mirror integration network will be given input from the child feature networks' mirror integration networks, rather than from the feature networks themselves. For example, integration neural network 414 receives inputs from feature neural networks 424, 436 and integration network 426.

The integration network is trained to detect information resembling the part of the object corresponding to the feature of that part's appearance being detected by the mirror feature network. Unlike the mirror feature network, the integration network contains relevant finer-scale information about the sub-feature it detects, namely the sub-features of this sub-feature. Thus, the integration network is a more reliable detector than the mirror feature network of the same sub-feature. In the preferred embodiment, the training for both the integration network and feature network is the same.

This method of adding integration networks at successively higher resolutions is repeated up to the root node. The mirror integration network 414 of the root node is a network whose output is an estimate of the probability that an OOI is present. Thus the outputs of the feature nets are incrementally combined to produce this probability estimate.

Alternatively, since each feature network and its corresponding mirror integration network have outputs representing the same type of information, the child feature network's outputs can be directly applied as inputs to a separate integration network, rather than their mirror integration nets' outputs. In this manner, the method determines the probability that an OOI is present without having to apply the entire tree. This probability can be used to decide whether to accept this example as a positive, a negative, or to continue applying the tree. Once the feature detection is integrated into object detection, method 300 ends in step 350.

However, those skilled in the art will realize that method 300 can be modified in many ways to produce similar results. For example, some geometric information can be introduced by having the integration networks receive input from a small window in the images of their outputs. Alternatively, it might also be useful to provide a child network with an upsampled window of the outputs of its parent, so it can determine where it lies relative to its parent feature. Another alternative is to apply competitive learning in training the networks to promote different children of a node to learn different patterns.

Thus, an "Feature Discovery" objective function and its gradient have been presented which allows a neural network or other parameterized function to be trained for detecting features of a set of objects which best discriminate the objects of this class from other parts of the images. Alternatively, accurate approximations of the objective function can be used to train the neural networks to reduce the computational expense. These equations express an estimate of the probability $\bar{p}_{o|d}$ that a pixel is in an object of the class of interest if the network generates a detection at that pixel.

Since the neural networks are trained with the FD or AFD objectives, the networks generally detect features which tend to be present in the objects of interest. One modification of the present invention is to incorporate features which tend not to be present in these objects. Thus, it is possible to train some neural networks on the complementary error function or to have a single error function which gives both kinds of features, favoring whichever kind is most useful. Furthermore, the FD or AFD objective functions can be used to train neural networks that are not assembled into a pattern tree.

A very common problem in supervised learning is the presence of errors in the training data. First, when training a network to detect objects in images, the positions of the objects in the training data may not be accurately specified or the objects may not even have definite positions. The second kind of errors are wrong classifications of examples for detection or classification problems. For example, a human may introduce errors into the training data by incorrectly selecting the positions of the desired objects or incorrectly classifying the objects, i.e., objects were incorrectly chosen as positive or negative examples.

Furthermore, extended objects may have definite boundaries, yet frequently it is not desirable to train the network to respond to all points within the objects' boundaries. Specific points within each object could be chosen as the points at which the network must respond, but frequently it will not be clear which points to choose. Thus, even though the objects' positions are well defined, the desired output of the network may not be. For objects without precisely-defined positions, it is desirable to train a neural network so that its output goes high somewhere within the object, without specifying precisely where. The present invention provides objective functions for training a network to detect objects whose positions and classifications in the training data are uncertain.

Most error functions, including the conventional cross-entropy objective function, are valid only if the positions of the objects are precisely specified. Specifically, the cross-entropy error function is expressed as:

$$E = -\sum_i [d_i \log(y(f_i)) + (1 - d_i)\log(1 - y(f_i))] \quad (8)$$

where the network's output for a given input vector is y, and with probability y it is decided that the example is a positive, i.e., came from an object that the neural network wishes to find. The probability of producing the correct output for a given feature vector f is $y^d(f)(1-y(f))^{1-d}$ (for brevity, the dependence of y on the network's weights will be suppressed throughout the discussion), where value $d \in \{0,1\}$ corresponds to the correct output for the example. The probability of reproducing the training set is the product of this over all examples. However, if the positions of the objects in the training images are imprecise, the training data contains examples for which the desired output d is unknown.

For the situation in which the exact positions of the objects are unknown, a "Detection Likelihood" (DL) objective function is presented which measures the probability of detecting all of the positives and none of the negative objects in the training data, if a positive is considered to be detected when at least one detection occurs within a certain region containing the given coordinates. In one embodiment, the DL objective function is used to train the root of the pattern tree in step 320 of FIG. 3. The only conditions of the application of this DL objective function is that the true positions of the objects in the training data are within a known distance of the given positions.

The DL objective function maximizes the probability of detecting the positives, i.e., of producing at least one detection within each positive region, and producing no detections elsewhere. Thus, for each positive object a small region must be chosen in which a detection by the neural network will be acceptable.

This objective function treats a detection at a point as a detection of all objects which have that point in their positive region. This is beneficial since missing such points could result in missing all of the overlapping objects. Searching at coarse resolution frequently encounters overlapping objects. Thus, detecting several objects by detecting a point is beneficial for the coarse-to-fine search approach as discussed above.

The probability of the neural network producing at least one detection in a positive region is expressed as one minus the probability of producing no detection in the region, or $1-\Pi_{\vec{x} \in Positive}(1-y(\vec{x}))$. The probability of making a correct decision, i.e., no detection, at a negative position $\vec{x}$ is $1-y(\vec{x})$. The probability of detecting all of the positives and no negative points is the product of $1-\Pi_{\vec{x} \in Positive}(1-y(\vec{x}))$ over all positives times the product of $1-y(\vec{x})$ over all known negatives. Thus, the DL error function is:

$$E_{DL} = -\sum_{i \in Positives} \log\left(1 - \prod_{\vec{x} \in Pos_i}(1 - y(\vec{x}))\right) - \sum_{\vec{x} \in Negatives} \log(1 - y(\vec{x})) \quad (9)$$

The gradient of $E_{DL}$ with respect to the network weights is:

$$\frac{\partial E_{DL}}{\partial w_a} = \sum_{i \in Positives} \left\{ \frac{\prod_{\vec{x} \in Pos_i}(1 - y(\vec{x}))}{\prod_{\vec{x} \in Pos_i}(1 - y(\vec{x})) - 1} \sum_{\vec{x} \in Pos_i} \frac{\partial y(\vec{x}/\partial w_a)}{1 - y(\vec{x})} \right\} + \sum_{\vec{x} \in Negatives} \frac{1}{1 - y(\vec{x})} \frac{\partial y}{\partial w_a}(\vec{x}) \quad (10)$$

Equations 9 and 10 are likely to be numerically well-behaved. However, during the early stages of training it is not uncommon for the network output at all positions in a positive region to be numerically zero, i.e., zero to the machine's precision. If the network's output unit has a sigmoidal activation function, the resulting singularity is avoided by re-writing the expressions in terms of the output unit's activation a.

Using $1-y=1/(1+e^a)$ and partial expansion of the product $1+e^a$, it can be shown that:

$$1 - \prod_{\vec{x}}(1 - y(\vec{x})) = \frac{\sum_i \left[ e^{a(\vec{x}_i)} \prod_{j>i}(1 + e^{a(\vec{x}_j)}) \right]}{\prod_{\vec{x}}(1 + e^{a(\vec{x})})} \quad (11)$$

$$= \sum_i \frac{e^{a(\vec{x}_i)}}{\prod_{j\leq i}(1 + e^{a(\vec{x}_j)})}$$

For each object, the sum and product can be accumulated in a loop over positions in the positive region. The singularity occurs if all y are nearly zero, i.e., if all a are negative and large in magnitude. In this case, one of the $e^a$'s is factored out and a maximum chosen for it, thus accumulating (dropping the x's, since the indices are adequate labels):

$$\sum_i \frac{e^{a_i - a^{Max}}}{\prod_{j\leq i}(1 + e^{a_j})} \quad (12)$$

If a new $a^{Max}$ is found, and it is still large in magnitude and negative, the current sum is multiplied by $e^{a^{OldMax}_{-}a^{NewMax}}$. At the end of the loop this positive region's contribution to the error is:

$$\varepsilon = -a^{Max} - \log\left(\sum_i \frac{e^{a_i - a^{Max}}}{\prod_{j\leq i}(1 + e^{a_j})}\right) \quad (13)$$

During the loop over positions, a position whose a is negative but relatively small or positive may be encountered. The factor $e^{a^{OldMax}_{-}a^{NewMax}}$ could be extremely small, so that equation 13 becomes inappropriate. In such case, modification of equation 11 with a partial sum and product up to the (k−1)-th term produces:

$$1 - \prod_{i=1}^{k-1}(1 - y(\vec{x}_i)) = \sum_{i=1}^{k-1} \frac{e^{a(\vec{x}_i)}}{\prod_{j\leq i}(1 + e^{a(\vec{x}_j)})} \quad (14)$$

where it is used to switch to accumulating the product of $1-y(\vec{x}_i)$. This can be expressed in terms of the partial sum up to the (k−1)-th term as:

$$\prod_{i=1}^{k-1}(1 - y_i) = 1 - e^{a^{Max}_{k-1}} \sum_{i=1}^{k-1} \frac{e^{a_i - a^{Max}_{k-1}}}{\prod_{j\leq i}(1 + e^{a_j})} \quad (15)$$

where $a_k^{Max}$ is the maximum activation among the first k points in the object. The derivative of the error in a positive region can be expressed as:

$$\frac{\partial \varepsilon}{\partial w_a} = \frac{\sum_i \left[ \frac{e^{a_i - a^{Max}}}{\prod_{j\leq i}(1 + e^{a_j})} \left( \sum_{j\leq i} y_j \frac{\partial a_j}{\partial w_a} - \frac{\partial a_i}{\partial w_a} \right) \right]}{\sum_i \frac{e^{a_i - a^{Max}}}{\prod_{j\leq i}(1 + e^{a_j})}} \quad (16)$$

if all of the a's are large and negative, and otherwise as in equation 10. Several sums and products are typically accumulated during the loop over positions in a positive region in order to evaluate equation 16.

For the sum over positives in equation 10, there is one sum and one product to accumulate. The product $\Pi_i(1-y_i)$ is already being accumulated for the error. Because of the properties of the sigmoidal function, the sum is equal to $\Sigma_{j\leq i} y_j \partial a_j / \partial w_a$ which must be accumulated for equation 16 anyway. Thus, it is easy to switch from equation 16 to equation 10 if not all of the activities are negative and large.

Therefore, a DL objective function for training neural networks to find objects with uncertain training object positions is disclosed. Although the DL objective function is applied to the training of the root node of the pattern tree in FIG. 3, its application is not so limited. The DL objective function can be used to train neural networks that are not assembled into a pattern tree.

The present invention also contains objective functions for handling errors in the training data for the detection learning task and the multiclass discrimination learning task, using maximum-likelihood criteria. For the detection learning task, the error function is:

$$E = -\sum_i \log[\pi_{d_i} y(x_i) + (1 - \pi_{d_i})(1 - y(x_i))] \quad (17)$$

where $y(x_i)$ is the output of the network for the i-th input vector $x_i$, $d_i \in \{0,1\}$ is the "Uncertain Desired Output" (UDO) for the i-th example, i.e., 0 indicates the example was considered to be a negative example of the class of interest, whereas 1 indicates it was considered to be a positive example of the class of interest, and $\pi_d$ is the probability that the example truly belongs to the class of interest given that the udo is d. $\pi_d$ can be thought of as a function with argument d from the two-element set $\{0,1\}$ to the interval $[0,1] \subset R$. Thus, $\pi_d$ has two values, $\pi_0$ and $\pi_1$.

The Uncertain Desired Output (UDO) error function (equation 17) is derived from the generalization that the goal of training is to produce the weights which are maximally likely to produce the correct outputs, rather than the specified desired outputs. For a single example, the probability of producing the correct output is the probability of this example being a positive given the specified desired output times the probability that it will be randomly decided as a positive given the network's output, plus the probability that the example is a negative example given the specified desired output times the probability that it will be randomly decided as a negative given the network's output. This is:

$$P(\text{correctforexample}\{x,d\}) = \pi_d y(x) + (1-\pi_d)(1-y(x)) \quad (18)$$

The probability that the correct decisions about membership in class A is made for the training data given the network's outputs on each of these examples is:

$$P(\text{correctdecisionsforthetrainingdata}) = \quad (19)$$
$$\prod_i [\pi_{d_i} y(x_i) + (1 - \pi_{d_i})(1 - y(x_i))]$$

As usual, it is convenient to train by minimizing the negative logarithm of equation 19, which provides the UDO error function of equation 17. It should be noted that if $\pi_d$ is not zero for either value of d, the UDO error function does not have the numerical problems of the cross-entropy error function (equation 8) when the network output saturates at zero or one.

For training neural networks, the gradient of the error with respect to the network weights is extremely useful. For the UDO error function, this is:

$$\frac{\partial E}{\partial w_a} = -\sum_i \frac{2\pi_{d_i} - 1}{\pi_{d_i}(x_i) + (1 - \pi_{d_i})(1 - y(x_i))} \frac{\partial y(x_i)}{\partial w_a} \quad (20)$$

Again, if neither $\pi_d$ is zero, no special treatment is necessary. If one of the two $\pi_d$'s is zero, then the network output may saturate at the wrong value, as with the conventional cross-entropy error function.

For the multiclass discrimination, if there are errors in the classifications in the training set, the error function is:

$$E = -\sum_i \log\left[\sum_c \pi_{c,d_i} p_c(x_i)\right] \quad (21)$$

where $p_c(x)$ is the same as for a softmax network, as discussed below. $\pi_{c,d}$ is the probability that an example truly belongs to class c if the uncertain desired class in the training data is d. $\pi_{c,d}$ can be thought of as a function with arguments c, d from the set $\{1, \ldots, N_c\} \hat{x} \{1, \ldots, N_c\}$ to the interval $[0,1] \subset R$, where $N_c$ is the number of classes.

The "UDO-softmax" error function (equation 21) is derived from the generalization of the Bridle's softmax error which generalizes the cross-entropy error function to the case with multiple classes. However, there is a difference, since treating the two-class case with softmax would require a network with two outputs. With $N_C$ classes, there are $N_C$ outputs $y_c$, $c \in \{1, \ldots, N_c\}$. The network's estimate of the probability of the example being in class c is:

$$p_c(x) = \frac{e^{y_c(x)}}{\sum_{c'} e^{y_{c'}(x)}} \quad (22)$$

The probability of choosing the correct class for an example, given the (assumed correct) desired classification d, is:

$$P(\text{correct}) = p_d(x) \quad (23)$$

The error function is again minus the logarithm of the product over all examples of the probability in equation 23, which gives:

$$E = -\sum_i \log(p_{d_i}(x_i)) \quad (24)$$

If there are errors in the desired classes in the data set, and the probability $\pi_{c,d}$ of an example belonging to class c given only its desired class d is estimated, then the probability of correctly classifying an example is:

$$P(\text{correct for example} | x, d\}) = \sum_c \pi_{c,d} p_c(x) \quad (25)$$

The probability of correctly classifying all of the training examples is:

$$\prod_i \left[\sum_c \pi_{c,d_i} p_c(x_i)\right] \quad (26)$$

Taking the negative logarithm of equation 26 gives the "UDO-softmax" error function of equation 21.

Again, the gradient of the error with respect to the network weights is extremely useful for training neural networks. For the UDO-softmax error function, this is:

$$\frac{\partial E}{\partial w_a} = \sum_i \sum_c \left[p_c(x_i) - \frac{\pi_{c,d_i} p_c(x_i)}{\sum_{c'} \pi_{c',d_i} p_{c'}(x_i)}\right] \frac{\partial y_c}{\partial w_a} \quad (27)$$

Note that if there are no errors in the desired classifications given in the training set, $\pi_{c,d} = \delta_{c,d}$, so that equation 26 reduces to equation 24, and equation 27 reduces to the usual softmax formula, $\partial e_i / \partial y_c = p_c(x_i) - \delta_{c,d_i}$ where $\partial e_i / \partial y_c$ is the derivative of the error on the i-th example $e_i$.

Therefore, a "UDO" objective function and a "UDO-softmax" objective function for handling errors in the training data for the detection learning task and the multiclass discrimination learning task are disclosed. Again, although these objective functions can be applied to the training of the root node of the pattern tree in FIG. 3, it's application is not so limited. These objective functions can be used to train neural networks that are not assembled into a pattern tree.

Alternatively, it is also possible to address errors in the training data for the detection learning task and the multiclass discrimination learning task by training the network with the conventional cross-entropy (equation 8) or softmax error function (equation 22). Namely, the network is trained on the training data, complete with its errors, and then the outputs are adjusted for the error probability while using the network. The network's output continues to be interpreted as a probability, but it is the probability that the example would have been given a particular uncertain desired output if it was in the training data. Thus, the alternative embodiments correct for the expected probability of error in order to estimate the probability that the example truly comes from the class of interest.

For the detection task, the corrected probability that the example with input vector x belongs to the class of interest is:

$$P(c=1|x) = \pi_1 y(x) + \pi_0(1 - y(x)) \quad (28)$$

Equation 28 is derived by estimating $P(c=1|x)$ which is not the underlying true probability that the example is a positive given the input, but rather it is the probability with which the example should be accepted as a positive, given the knowledge of the probability that an expert would determine it as a positive. After training, the network computes the probability $P(d=1|x)$ that an expert would determine that an example with feature vector x is a positive. $P(c=1|x)$ can be computed from $P(d=1|x)$ and the $\pi_d$'s. Expressing $P(c=1|x)$ as a sum over probabilities with different values of d:

$$P(c=1|x) = P(c=1, d=1|x) + P(c=1, d=0|x) \quad (29)$$

Factor the $P(c,d|x)$ into $P(c|d)P(d|x)$ (this is valid because of the interpretation of $P(c=1|x)$, as discussed above). This gives:

$$P(c=1|x) = P(c=1|d=1)P(d=1|x) + P(c=1|d=0)P(d=0|x) \quad (30)$$

Replace $P(c=1|d)$ with $\pi_d$ and $P(d=0|x)$ with $1-P(d=1|x)$ to get:

$$P(c=1|x)=\pi_1 P(d=1|x)+\pi_0(1-P(d=1|x)) \tag{31}$$

Thus, if the neural network's output for the input x is y(x), then the output should be transformed to the corrected probability of equation 28 as discussed above in order to get the best estimate for $P(c=1|x)$ given the available information.

For the multiple-class task, the corrected probability that the example with input vector x has the true class c given the network outputs is:

$$P(C=c|x) = \sum_{d=1}^{N_c} \pi_{c,d} y_d(x) \tag{32}$$

Here, the network has $N_C$ outputs, one for each class. Using Bridle's softmax function to compute the probabilities of an example belonging to each class from the network outputs and following the above derivation, the probability of an example with input x belonging to class c can be written as:

$$P(C=c|x) = \sum_{d=1}^{N_c} P(C=c, D=d|x) \tag{33}$$

where C is the random variable describing which class the instance belongs to, of which $c \in \{, \ldots, N_C\}$ is a sample, and D is the random variable describing which class the instance would be assigned to in the desired outputs, of which is $d \in \{1, \ldots N_C\}$ a sample. Factor the $P(C=c, D=d|x)$ into $P(C=c|D=d)P(D=d|x)$ to get:

$$P(C=c|x) = \sum_{d=1}^{N_c} P(C=c|D=d)P(D=d|x) \tag{34}$$

Denote $P(C=c|D=d)$ with $\pi_{c,d}$ as before to get:

$$P(C=c|x) = \sum_{d=1}^{N_c} \pi_{c,d} P(D=d|x) \tag{35}$$

In order to get the best estimate of $P(C=c|x)$ given the available information, the corrected probability of equation 32 is used, where $y_d(X)$ is the output of the network for class d, after training the network on the desired outputs with errors. Thus, a method for adjusting the outputs of a neural network for the error probability while the network is trained with conventional objective functions (cross-entropy and softmax) is disclosed.

However, the method for correcting the output of a network that was conventionally-trained with errors in the desired outputs does not give the maximum-likelihood estimate of the conditional probability, and it is not equivalent to choosing the maximum-likelihood estimate for the network's weights. Namely, the conditional probability produced by the these two different methods are not the same. Generally, the UDO error functions are numerically better-behaved than the "corrected" cross-entropy or softmax error functions. The UDO error functions could also be more robust in the presence of the errors. For example, it might tend to ignore errors that are clustered in a particular part of input space.

However, both methods may produce similar results and the performance of each method may depend on the specific application. Since there is a general preference in the community for maximum-likelihood kinds of arguments, the UDO error functions are generally preferred.

Thus, objective functions have been presented for training networks to detect objects in images when the objects' positions are not accurately specified in the training data. Furthermore, other objective were derived for detection and classification problems when the training data is known to have false examples.

The present invention can be employed to exploit contextual information for improving assisted search and automatic target recognition (ATR). Problems analogous to assisted search and ATR exist in the medical imaging community. For example, radiologists will search for microcalcifications in mammograms for early detection of breast cancer. These microcalcifications are small (less than 5 millimeters) and difficult to detect, and contextual information (e.g. clustering of calcifications, location relative to anatomical structure, etc.) can prove useful for improving detection. A method and apparatus for applying the DL objective function for training neural networks in a hierarchical neural network architecture to detect microcalcifications in mammograms is disclosed.

Figure 5:
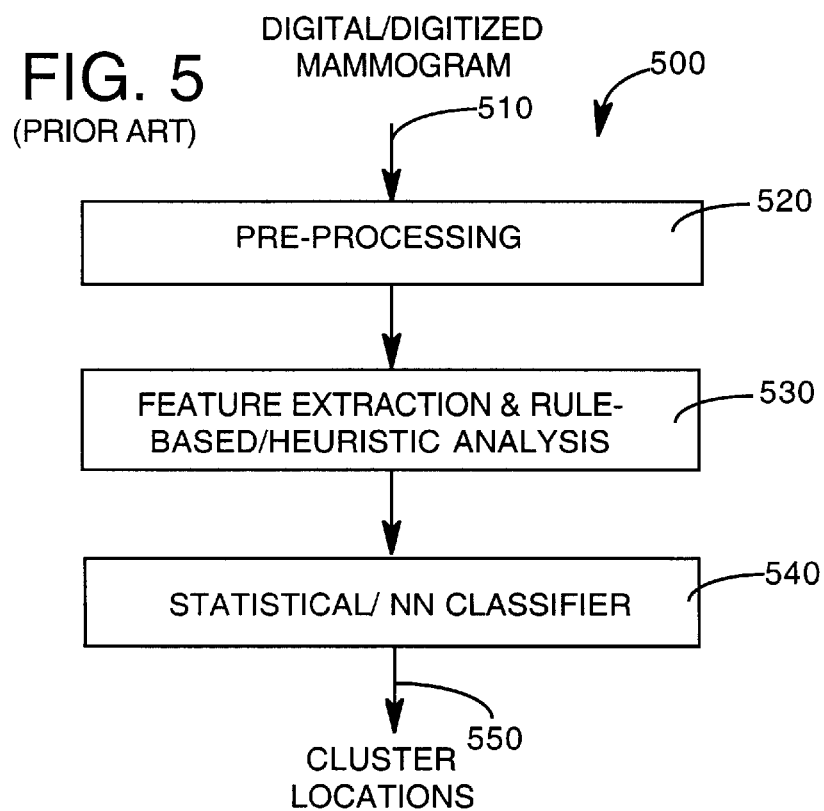
FIG. 5 illustrates the general processing blocks of a typical CAD system for microcalcification detection.

FIG. 5 illustrates the general processing blocks of a typical CAD system 500 for microcalcification detection with a neural network detector/classifier. The system contains a pre-processing section 520, a feature extraction and rule-based/heuristic analysis section 530 and a statistical/neural network (NN) classifier 540.

First, the system receives a digital/digitized mammogram 510, where the pre-processing section 520 segments the breast area and increases the overall signal-to-noise levels in the image. At this early state, regions of interest (ROIs) are defined representing local areas of the breast which potentially contain a cluster of calcifications.

Next, the feature extraction and rule-based/heuristic analysis section 530 applies thresholds and clustering criteria to the extracted features, given prior knowledge of how calcification clusters typically appear in the breast, in order to prune false positives.

Finally, the remaining ROIs are processed by a statistical classifier or neural network, which has been trained to discriminate between positive and negative ROIs. The advantage of having a neural network as the last stage of the processing is that a complicated and highly nonlinear discrimination function can be constructed which might otherwise not be easily expressed as a rule-based algorithm.

However, some CAD systems may produce a high number of false positives which is unacceptable by radiologists. An important goal has therefore been to establish methods for reducing false positive rates without sacrificing sensitivity.

Figure 6:
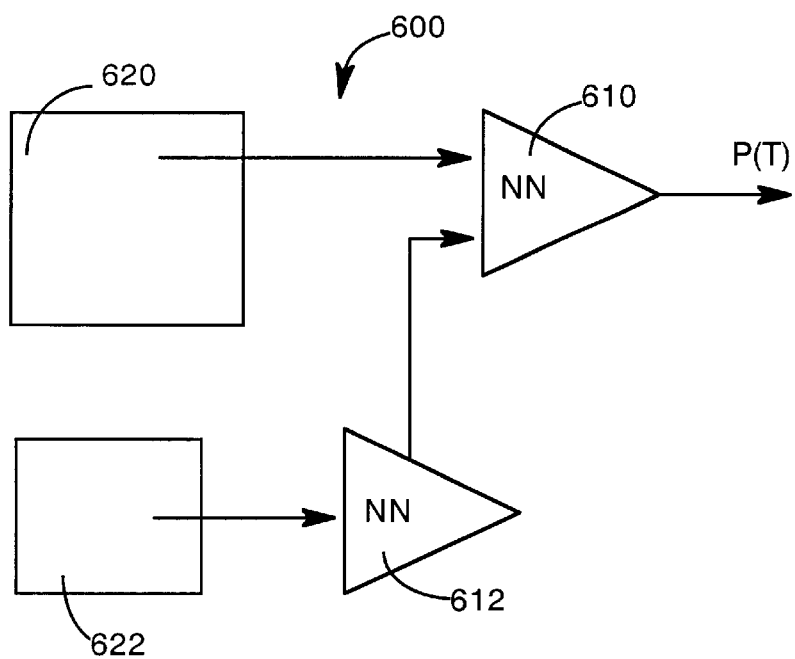
FIG. 6 illustrates a conventional hierarchical pyramid/neural network (HPNN)

FIG. 6 illustrates a conventional hierarchical pyramid/neural network (HPNN) 600 for detecting individual microcalcifications. The input to the HPNN are features at two different levels 620 and 622 of an image pyramid (levels 2 and 3, with level 0 being full-resolution) with the outputs, p(T), representing the probability that a target is present at a given location in the image. The HPNN comprises two neural networks 610 and 612. Neural network 612 processes data from level 3 features while neural network 610 processes data from level 2. Furthermore, in this architecture, information is propagated hierarchically, with the outputs of the hidden units (not shown) of the neural network 612 serving as inputs to the neural network 610.

Figure 7:
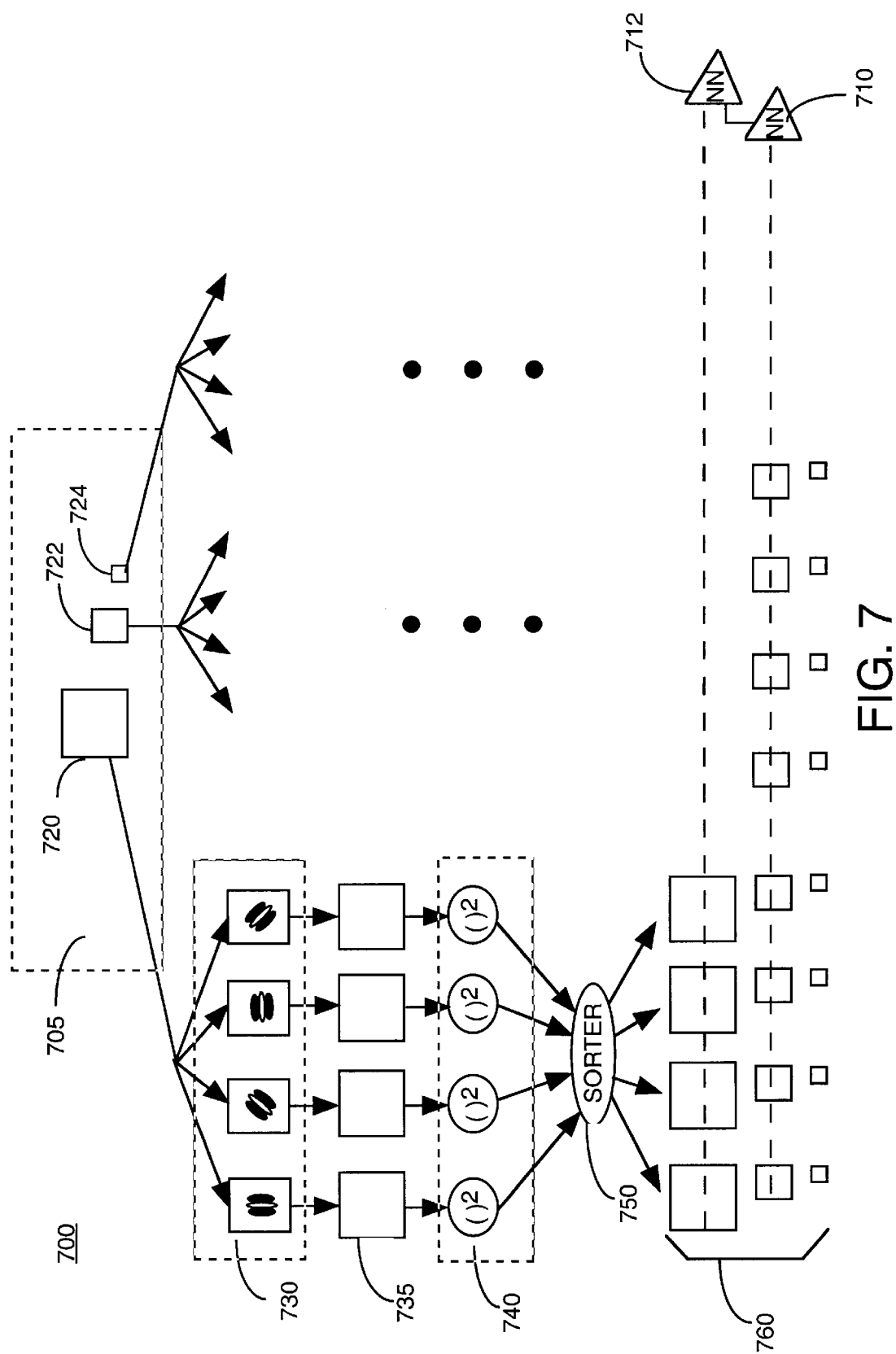
FIG. 7 illustrates an apparatus for generating an "integrated feature pyramid" (IFP) for providing inputs to a neural network.

FIG. 7 illustrates an apparatus 700 for generating an "integrated feature pyramid" (IFP) from an input image which is provided as input to neural networks 710 and 712. The IFP contains features constructed at several scales, allowing the neural networks to take advantage of coarse-to-fine search and to operate on only a small region of the entire image.

The features in the IFP are sorted, oriented "energies" at several image scales 720–724. Namely, a Gaussian pyramid generator 705 constructs a Gaussian pyramid having several image scales 720–724 of a sample of an input signal, e.g., an input image (a mammogram, a photograph, video frame and etc.). In turn, a filter section 730 applies (4) oriented high-pass filtering to each image of the pyramid. The pixel values in these images 735 are then squared by a squaring section 740 to get the energies. This ensures that when the resolution is reduced by low-pass filtering, the resulting image features are present. Orientation-invariant features are constructed via sorter 750 by sorting the energy images by their magnitude at each pixel location. The resulting features are useful because the relative size of the minimum energy compared with the maximum energy indicates the degree to which the local image detail is oriented. Finally, another Gaussian pyramid generator 760 generates Gaussian pyramids of these feature images, with a neural network 710 integrating the features across a given level and a neural network 712 integrating the features across a different level and so on.

The neural networks in FIGS. 6 and 7 are multi-layer perceptrons, having one hidden layer with four hidden units. All units in a network perform a weighted sum of their inputs, subtracting an offset or threshold from that sum to get the activation:

$$a = \sum_i w_i x_i - \theta \tag{36}$$

This activation is transformed into a unit's output, y, by passing it through the sigmoid function:

$$y = \sigma(a) = \frac{1}{1 + e^{-a}} \tag{37}$$

The networks are trained using the cross-entropy error function of equation 8. where $d \in \{0,1\}$ is the desired output. To obtain the objective function for the optimization routine, the total error is computed on the training examples, adding to it a regularization term:

$$r = \frac{\lambda}{2} \sum_i w_i^2 \tag{38}$$

This type of regularization is commonly referred to as "weight decay", and is used to prevent the neural network from becoming "over-trained." $\lambda$ was adjusted to minimize the cross-validation error. Cross-validation error was computed by dividing the training data into a number of separate disjoint subsets, whose union is the entire set. The network was first trained on all of the training data, and then, starting from this set of weights, the network was retrained on the data with one of the subsets left out. The resulting network was tested on the "holdout" subset. This retraining and testing with a holdout set was repeated for each of the subsets, and the average of the errors on the subsets is the cross-validation error, an unbiased estimate of the average error on new data.

The HPNN receives as input a single pixel from the same location in each of the feature images at the resolution being searched. The HPNN also receives hierarchical contextual input (i.e. output of the hidden units of the level 3 net are inputs to the level 2 net). The output of the HPNN is an estimate of the probability that a microcalcification is present at a given position, conditioned on its input. In applying the HPNN to the task of microcalcification detection, findings indicate that certain hidden units appear to represent information about the location of ducts, implying that the HPNN utilizes context to increase microcalcification detection accuracy.

Figure 8:
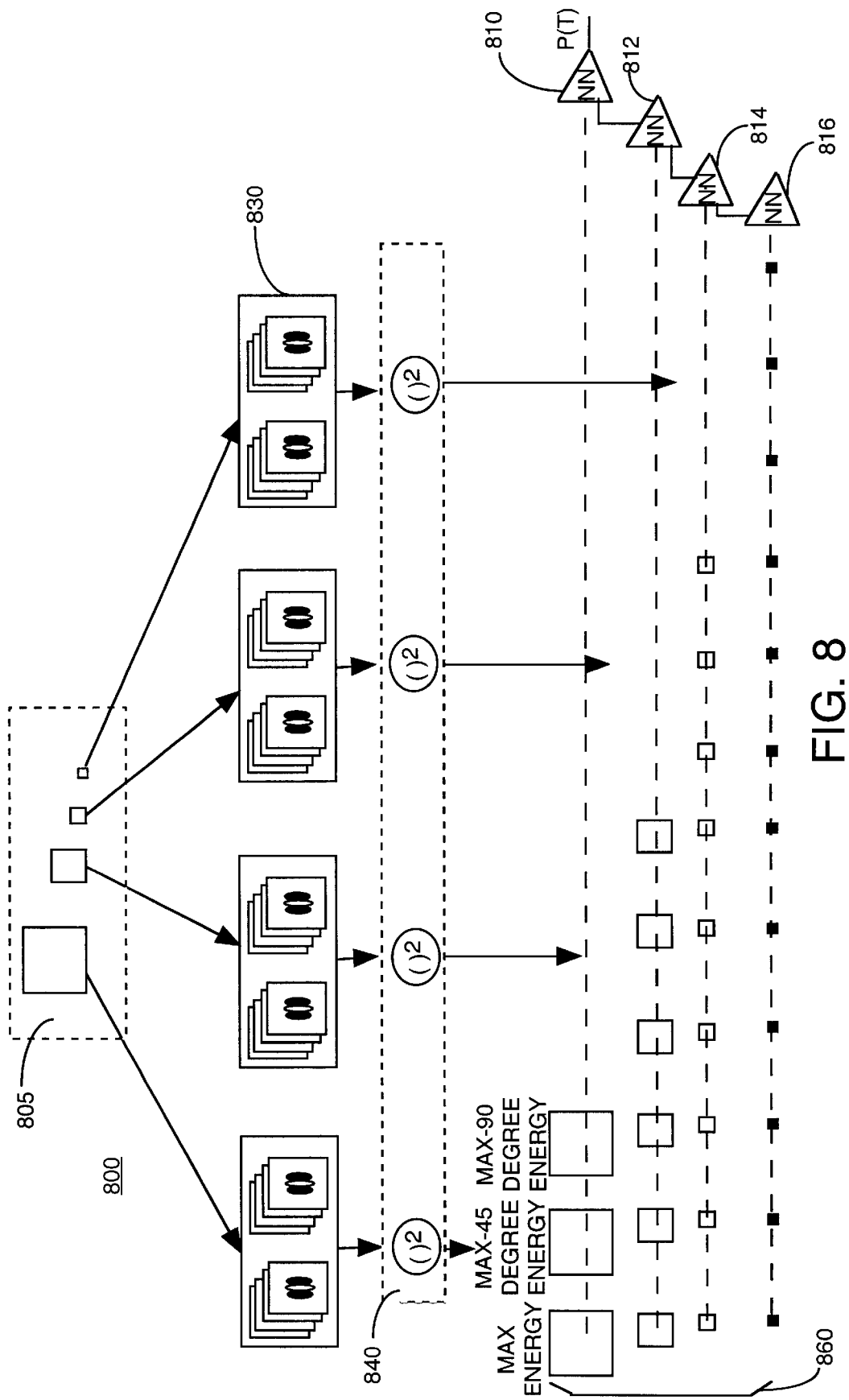
FIG. 8 illustrates a second embodiment of an apparatus for generating an "integrated feature pyramid" (IFP)

FIG. 8 illustrates another embodiment of an apparatus 800 for generating an "integrated feature pyramid" (IFP) which can be incorporated into existing microcalcification detection CAD system as shown in FIG. 5 for reducing false positive regions of interest (ROIs). In this embodiment, the IFP is used as inputs to a HPNN architecture that incorporates a four level hierarchy (levels 0 to 3) as opposed to the two levels used in the HPNN of FIG. 7. Namely, the input to the HPNN are features at four different levels of an image pyramid. In turn, the HPNN comprises four neural networks 810, 812, 814 and 816, where neural network 816 processes data from level 3 features with the outputs of its hidden units (not shown) serving as inputs to the neural network 814 and so on in a hierarchical manner.

In addition, the IFP is constructed differently. Before constructing the integrated feature pyramid, a background trend correction technique is applied to all the ROIs. Namely, steerable filters 830 were used to compute local orientation energy. The steering properties of these filters enable the direct computation of the orientation having maximum energy. At each pixel location, features which represent the maximum energy (energy at $\theta_{max}$), the energy at the orientation perpendicular to $\theta_{max}(\theta_{max}-90°)$, and the energy at the diagonal (energy at $\theta_{max}-45°$) were constructed. In sum, the IFP generator of FIG. 8 replaces the oriented high-pass filters 730 with steerable filters 830, thereby eliminating the need for the (sorter) 750 as shown in FIG. 7. In turn, Gaussian pyramid generator 860 construct pyramids for these features which are then fed into the network hierarchy as shown in FIG. 8.

Referring to FIG. 8, each network in the HPNN hierarchy receives 3(L+1) inputs from the integrated feature pyramid and 4 hidden unit inputs from the L−1 network, with the exception of the level 3 network 816, which has no hidden unit inputs. However, the use of the IFP is not limited to the network architecture of the HPNN. In fact, the IFP can be used in conjunction with the pattern tree architecture as discussed above or other network architectures.

Since radiologists often make small errors in localizing the individual calcifications, the DL error function of equation 9 is used to train the neural networks for reducing false positives. These errors generally appear to be within ±2 pixels of the correct position.

The HPNN is applied to every pixel in the input, in raster scan, and a probability map is constructed from the output of the Level 0 network. This map represents the network's estimate of the probability (continuous between 0.0 and 1.0) that a microcalcification is at a given pixel location. Training and testing was done using a jackknife protocol, whereby one half of the data is used for training and the other half for testing.

For a given ROI, the probability map produced by the network is thresholded at a given value (between 0.0 and 1) to produce a binary detection map. Region growing is used to count the number of distinct regions. If the number of regions is greater than or equal to a certain cluster criterion, then the ROI is classified as a positive, else it is classified a negative.

Figure 9:
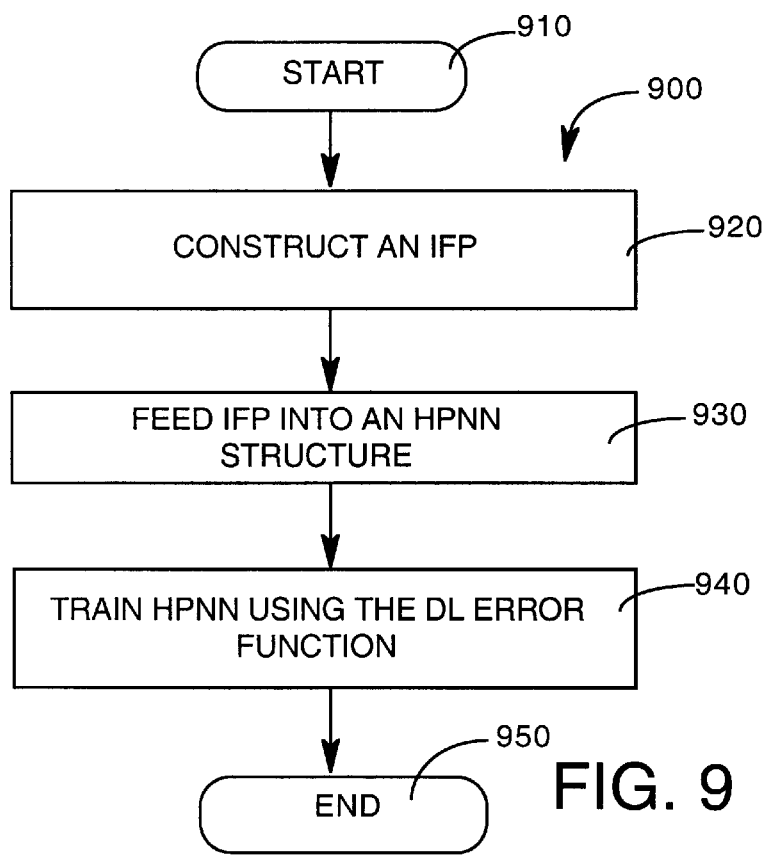
FIG. 9 illustrates the method of applying a hierarchical pyramid/neural network architecture to the problem of finding microcalcifications in mammograms.

FIG. 9 illustrates the method 900 of applying a hierarchical pyramid/neural network architecture to the problem of finding microcalcifications in mammograms. The HPNN utilizes contextual and multi-resolution information for reducing the false positive rates of an existing CAD system for microcalcification detection.

Referring to FIG. 9, method 900 begins in step 910 and proceeds to step 920 where the method constructs an integrated feature pyramid by decomposing the image by orientation and scale. As discussed above, the decomposition of the image by orientation can be accomplished by using oriented high-pass filters or steerable filters. Once the image is decomposed, the method proceeds to step 930.

In step 930, the resulting features from the decomposed image is feed into an HPNN structure where the neural network integrate the features across a given level. Furthermore, outputs of hidden units from the neural network of a lower level is feed as inputs to the neural network of the next level and so on in a hierarchical fashion. FIG. 7 and 8 illustrate two specific HPNN structures with two and four levels. However, HPNN structures with other levels are also permitted and may produce similar results.

In step 940, the HPNN is trained using the DL error function of equation 9. This error function is particularly well suited for the detection of microcalcifications because their locations in a mammogram may not be accurately specified or may not have definite positions. Those skilled in the art will realize that the training step of 940 does not have to follow step 930. In fact, the HPNN can be trained prior to receiving the IFP as inputs. Finally, the method ends in step 950.

Those skilled in the art will realize that the HPNN is not limited to the detection of microcalcifications in mammograms and can be applied to various applications such as analyzing aerial imagery. Furthermore, although the present invention is described with objects in images, those skilled in the art will realize that the present invention can be applied to events in a signal, i.e., detecting events in one-dimensional signals, or specific conditions in signals with any number of dimensions greater than zero.

In the above disclosure, a conventional neural network structure (HPNN) as shown in FIG. 6 is deployed in conjunction with the IFP for recognizing objects in images while exploiting information from multiple scales. Such HPNN structure is successfully applied to the detection of microcalcifications in regions-of-interest (ROIs) extracted from mammograms by a computer-aided diagnosis (CAD) system. It should be noted that the (HPNN) structure as disclosed above can be referred to as a "coarse-to-fine" HPNN structure. Namely, these HPNNs are designed to integrate information from several image scales using a pyramid decomposition of the image, and use that information to help detect small objects in images. At each resolution in these HPNNs, a neural network is trained to perform the detection task. The output of the network's hidden nodes are used as inputs to the network at the next finer resolution. At each level in the neural network pyramid, this step is repeated, where the outputs of the network's hidden units or neurons are used as inputs to the network at the next higher-resolution level in the pyramid. Each network is typically trained alone, beginning with the network at the coarsest scale so that the inputs for the next network are available.

However, it has been observed that the "coarse-to-fine" HPNN structure may not be appropriate for detecting larger objects. For example, in examining and classifying ROIs extracted from mammograms by a computer-aided diagnosis system to determine whether they contain malignant masses or false-positives, it has been observed that the performance of the "coarse-to-fine" HPNN is not robust in detecting masses that are relatively large when compared to the ROI.

Figure 10:
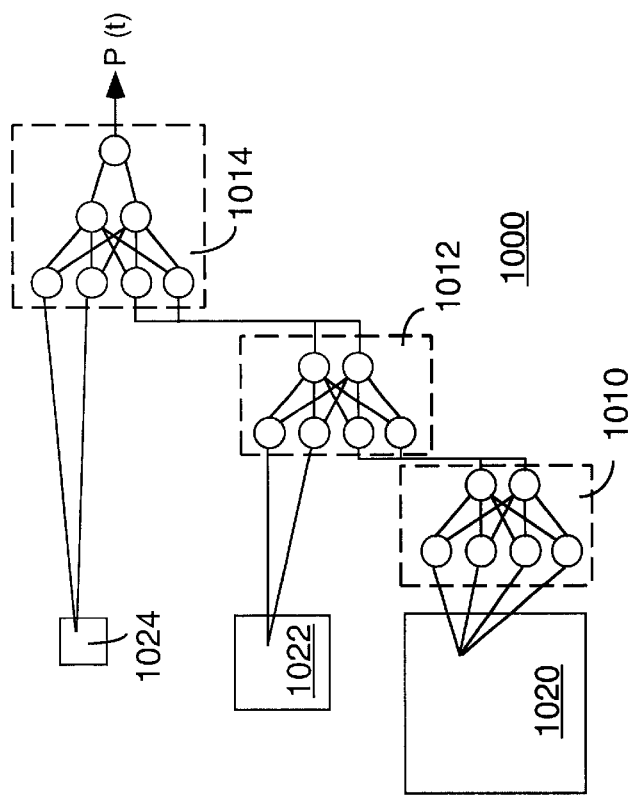
FIG. 10 illustrates a novel hierarchical pyramid/neural network (HPNN) of the present invention.

To address this criticality, FIG. 10 illustrates a novel hierarchical pyramid neural network 1000 of the present invention. The new network architecture can be referred to as "fine-to-coarse" HPNN. In brief, the outputs of neurons in a particular pyramid level of the present fine-to-coarse HPNN are used as features of neurons at the next coarser pyramid level.

More specifically, the input to the HPNN 1000 are features at three different resolution levels 1020–1024 of an image pyramid (with level 1020 being full-resolution) with the outputs, p(T), representing the probability that a target is present at a given location in the image. The illustrative HPNN comprises three neural networks 1010–1014. Neural network 1010 processes data from resolution level 1020 features while neural network 1012 processes data from resolution level 1022 and so on. Furthermore, in this architecture, information is propagated hierarchically, with the outputs of the neural network 1010 serving as inputs to the neural network 1012 and so on.

Although the illustrative hierarchical pyramid neural network 1000 comprises three separate neural networks 1010–1014, it should be understood that the hierarchical pyramid neural network 1000 may comprise any number of neural networks depending on the number of decomposed resolutions of the input image. For example, if the input image is decomposed into five resolutions, then the hierarchical pyramid neural network 1000 will have at least five separate neural networks with each separate neural network being deployed to process features for a particular resolution of the input image.

However, for "extended objects" (i.e., objects that are relatively large when compared to the ROI, e.g., the object or a portion of the object occupies a significant fraction of the ROI), it is anticipated that the output level of a fine-to-coarse HPNN would correspond to the pyramid level at which the objects appear to occupy about one pixel, so that all the detail information can be integrated at this level. Namely, there is no need to proceed to a lower or coarser level since the object may no longer be present at the next coarser level. The resolution level where the objects appear to occupy about one pixel can be referred to as the "natural level" or "natural scale" of the objects to be detected. It should be noted that the objects of the class that are desired to be detected, are referred to as targets.

Although the above novel HPNN of FIG. 10 is useful in detecting extended objects, it has been observed that it is not robust when the sizes of objects vary significantly. Namely, if the sizes of objects vary widely, it is difficult to select a particular natural level for all objects. One could try to solve this by searching over scale as well as position. Even then, the optimum level for a given example is frequently not known. Even for targets that all have the same size, the level may not be known if that size isn't the same in all directions.

Furthermore, it has been noted that the fine-to-coarse HPNN is not robust in exploiting context, whereas the coarse-to-fine HPNNs as disclosed above employ context to aid in the detection of very small objects in images. It should be noted that extended objects that do not totally fill the image may also have relevant associated context that can be exploited to aid in their detection.

Figure 11:
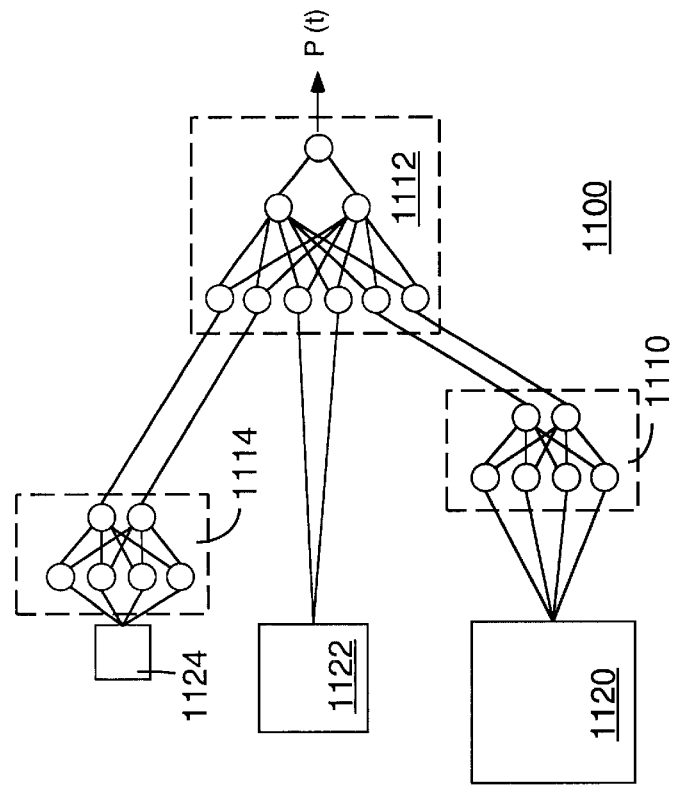
FIG. 11 illustrates a second embodiment of the hierarchical pyramid/neural network (HPNN) of the present invention.

FIG. 11 illustrates an alternate embodiment of a hierarchical pyramid neural network 1100 of the present invention. This new network architecture is a combination of the "fine-to-coarse" HPNN and the "coarse-to-fine" HPNN.

Specifically, the input to the illustrative HPNN 1100 are features at three different resolution levels 1120–1124 of an image pyramid (with level 1120 being full-resolution) with the outputs, p(T), representing the probability that a target is present at a given location in the image. The illustrative HPNN 1100 comprises three neural networks 1110–1114. Neural network 1110 processes data from resolution level 1120 features while neural network 1114 processes data from resolution level 1124. However, unlike a traditional coarse-to-fine HPNN and the above novel fine-to-coarse HPNN, information is propagated hierarchically in both directions, such that the outputs of the hidden or output neurons of the neural networks 1110 and 1114 serve as inputs to the neural network 1112.

Specifically, information is integrated both from fine-to-coarse and from coarse-to-fine pyramid levels in order to detect objects at an intermediate level. This HPNN structure employs at least one neural network at each level. The outputs of each network at a level coarser than the "natural level" of the targets are used as inputs to the network at the next finer level. This is the arrangement of the coarse-to-fine HPNN as shown above in FIG. 6. Additionally, like the fine-to-coarse HPNN of FIG. 10, the outputs of a network at a level finer than the natural level of the targets are used as inputs for the network at the next coarser level. At the natural level of the targets, the network's output is the output of the entire HPNN.

Again, the HPNN shown in FIG. 11 does not allow for uncertainty in the targets' natural level. Namely, the natural level has been previously determined and selected to be the resolution level 1122.

However, it is more desirable to allow the HPNN to determine the targets' natural level as the images are processed. To achieve this capability, the HPNN should be able to detect a target at one of several levels.

However, the neural networks at these levels should receive inputs from both finer and coarser levels. Connecting the networks in this fashion at several levels will create loops, thereby requiring the use dynamic networks. Although dynamic networks can be employed in this fashion, dynamic networks are also much more complex to train and use.

Figure 12:
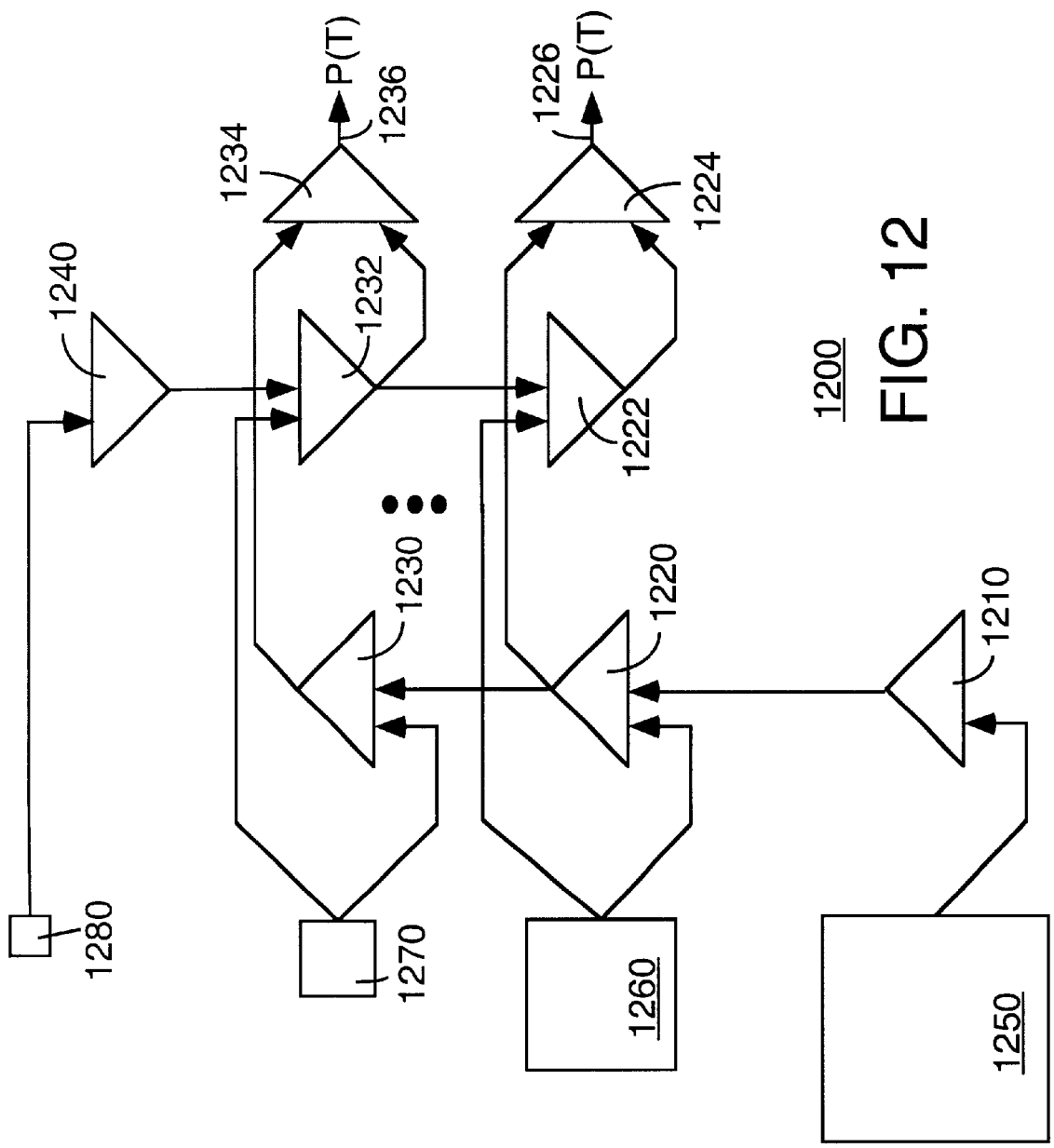
FIG. 12 illustrates a third embodiment of the hierarchical pyramid/neural network (HPNN) of the present invention.

To avoid feedback loops, FIG. 12 illustrates another alternate embodiment of a hierarchical pyramid neural network 1200 of the present invention. Specifically, the input to the illustrative HPNN 1200 are features at four different resolution levels 1250–1280 of an image pyramid (with level 1250 being full-resolution) with the outputs, p(T), representing the probability that a target is present at a given location in the image. The illustrative HPNN 1200 comprises eight neural networks 1210–1240. Neural network 1210 processes data from resolution level 1250 features while neural network 1240 processes data from resolution level 1280. Similar to the HPNN of FIG. 11, the outputs of the hidden or output neurons of the neural networks 1210 and 1240 serve as inputs to other neural networks.

However, unlike the HPNN of FIG. 11, intermediate resolution levels such as 1260 and 1270 have multiple neural networks, 1220–1224 and 1230–1234, respectively. Namely, two networks (e.g., 1220–1222 and 1230–1232) are employed at those intermediate pyramid levels that provide input both to coarser and finer levels. One network (e.g., 1220) provides features only to coarser levels, while the other network (e.g., 1232) provides features only to finer levels. The HPNN of FIG. 12 can be perceived as employing two HPNNs, one coarse-to-fine and one fine-to-coarse. To reduce this novel HPNN structure into a general form, a third network (e.g., 1224 or 1234) at each intermediate output level is employed to combine the outputs of the coarse-to-fine and fine-to-coarse networks to make an overall output for the intermediate level. It should be noted that the definition for the intermediate level is a level this is between the highest and the lowest resolution levels. Thus, the HPNN of FIG. 11 can be perceived as a special case of the generalized HPNN of FIG. 12.

The generalized HPNN of FIG. 12 has multiple outputs P(t) 1226 and 1236, and the HPNN 1200 will decide how to compute a single output at a particular image location. Since an output at each location of every output pyramid level is produced, a single output can be determined by reviewing at each output level for outputs that exceed some threshold for a particular application.

For example, a single output can be computed by using a part of the UOP error function as discussed below in equation (40). The relevant part is:

$$\Pr(T) = 1 - \prod_{x \in P}(1 - y(x)), \qquad (38a)$$

where P is defined below, i.e., the probability of detecting at least one of the pixels in P. A threshold can be chosen by examining the outputs on a set of examples different from the training set. Each possible value for the threshold would provide some "true-positive fraction" (TPF), i.e., the output on a fraction TPF of the positive examples is greater than the threshold. Each threshold also gives a "false-positive fraction", i.e., the fraction of the negative examples on which the output is greater than the threshold. Thus, a threshold is selected that provides the best compromise between true- and false-positive fractions, e.g., where the former is preferably to be one, while the latter is preferably to be zero. Since it is infrequent that such ideal performance is obtained, a threshold selected based upon a reasonable compromise will be acceptable.

Thus, the present HPNN structures use information from several image scales for object recognition. The HPNN structures integrate information from either coarse to fine scales, from fine to coarse scales, or both fine and coarse scales to intermediate scales. These HPNN structures (fine to coarse scales or both fine and coarse scales) are able to detect objects that are extended, and thus have significant internal structure, and also have significant larger-scale context with which they are associated. The fine and coarse scales HPNN architectures of FIGs. 11 and 12 also allow for uncertainty in the optimal scale at which a given target should be detected, a situation that should be quite common. This generalized HPNN involves only feed-forward connections, thereby avoiding the complication of training and using networks with cycles or loops. A corresponding error function for training these architectures are presented below.

The HPNN structures of the present invention also offer superior training benefits. For example, instead of an HPNN structure, an alternate approach can use a single large neural network with a very large region of the image as an input. However, such large neural network is unlikely to perform well, since such a large neural network is quite complex and difficult to train. In contrast, the individual neural networks of the HPNN are quite small, and thus easy to train while avoiding "over-fitting". Over-fitting is a problem with neural network training where the performance of the neural network is quite good on the training data, but poor on new data. Since the HPNN detection algorithm and its training algorithm are divided into small tasks, it has been observed that over-fitting is minimized.

For training the present HPNN, it is necessary to evaluate the error on each example. To achieve this goal, the above DL error function of equation (9) is generalized to an error function that allows for uncertainty as well as position. The DL or UOP (Uncertain Object Position) error for a set of positive and negative examples is:

$$E_{UOP} = -\sum_{p \in Pos} \log\left(1 - \prod_{x \in p}(1 - y(x))\right) - \sum_{x \in Ney} \log(1 - y(x)) \quad (39)$$

It should be noted that equation (39) is identical to equation (9), but it is simply rewritten here in slightly different form. Here y(x) is the network's output when applied to position x. y(x) is treated as the network's estimate of the probability that position x should be detected. The quantity $1-\Pi_{x \in p}(1-y(x))$ is the probability of detecting one pixel within a set of pixels p. Each such p defines a region in which detecting a pixel is acceptable as a detection of the corresponding target. NEG is the set of all negative pixels. It may include all pixels not in one of the sets p∈Pos. If the training set is defined by the detection of regions by some other detector (as in mammographic CAD), Neg may be the union of sets of pixels like the p's, one for each false-positive.

To use the UOP error function of equation (39), a set of pixels p for each example is defined. Typically, one can define it as those pixels at the output level that overlap the center of the target (or false positive). For example, one can defined p as follows:

1) Define the set of pixels containing only the given center pixel at level 0 (the finest level) $p_0$.
2) Expand the set by adding all the pixels that are nearest neighbors to the pixel in $p_0$, and call the next set $p'_0$. 3) Subsample this set, i.e., keep each pixel in $p'_0$ that would be kept when subsampling a level 0 image, and call this new set $p_1$.
4) Given a set $p_1$ at level 1, make a set $p'_1$ by adding in all the pixels that are nearest neighbors to any pixel in $p_1$, but are not yet in $p_1$.
5) Sub-sample $p'_1$ to get $p_{1+1}$.
6) Iterate to reach the output level.

Extending the UOP error to include uncertainty in scale can be achieved by replacing p with $P = \cup_l p_l$, where the union is over all output levels. The UOP error changes to:

$$E_{UOP} = -\sum_{P \in Pos} \log\left(1 - \prod_{x \in p}(1 - y(x))\right) - \sum_{x \in Neg} \log(1 - y(x)) \quad (40)$$

The sum over negative locations x must now be a sum over output scales as well as positions.

Training a neural network is an optimization problem. One must choose an objective function to minimize, usually a measure of the network's error on each example, summed over examples in a training set of examples. The training algorithm's goal is to minimize this objective function by adjusting the network's parameters or weights. As discussed above, a problem with network training is "over-fitting", in which the performance is quite good on the training data but poor on new data.

To address this criticality, some large neural network designers have employed a technique sometimes called "early stopping", in which training is halted when performance on a set of test data (not the training data) stops decreasing or begins to degrade. One problem with this a approach is that one cannot know whether the test set performance will begin to improve again if training is continued. There is no reason to believe that test-set performance changes monotonically as one trains, and some users have observed oscillations in it.

A widely-used alternative to early stopping is to add a penalty function or regularizer to the objective function and then apply a standard optimization technique that converges reliably to a minimum. The regularizer usually has an adjustable overall factor, which is chosen to optimize test-set performance, or some other estimate of generalization performance. One disadvantage of this approach is the added computational cost. A common regularizer is the sum of the squares of the network's parameters multiplied by a constant. This is called the "weight-decay" regularizer.

Most common regularizers such as weight-decay may not perform well for traditional "convolution network", or the HPNN structures of the present invention, due in part of their many layers. It is general belief in the neural network community that a network with many layers is very hard to train because the error is attenuated over many layers. The idea is that a change in the weights at a layer that is many layers from the output has little effect on the output, and so it does not train much. This situation is very likely to occur early in training, since randomly-chosen weight vectors almost always result in neurons whose outputs vary little with the neurons' inputs. The derivative of the objective function with respect to the weights from these layers will be dominated by the regularizer. Gradient-descent training algorithms will then set these weights to zero or nearly zero, with the result that the layers do not contribute significantly to the output at all, thereby resulting in the neural network's inability to learn anything useful.

It should be noted that the fine-to-coarse HPNN receives as inputs preset features extracted from the image at each resolution, whereas the conventional convolution network typically receives preset features only at the highest resolution. The HPNN structures of the present invention are premised on the observation that features from multiple resolutions are relevant for object detection. It is widely accepted that such biases, when correct, can simplify the network, improve performance, make the network easier to train, and make the network more robust with regard to its performance on new data.

Furthermore, although the present invention is described as having a plurality of neural networks, those skilled in the art will realize that the functions performed by these neural networks can be adapted into a single much larger neural network. Additionally, although the present invention describes a plurality of resolution levels and at least one neural network that is tasked for receiving inputs from each of the resolution levels, the present invention should not be so limited. Specifically, there may be reasons for not receiving inputs from some resolution levels for a particular application or having more or less neural networks for a given resolution level. For example, resolution level 1250 of FIG. 12 may also incorporate additional neural networks, e.g., an output network, in addition to the neural network 1210. Furthermore, it should be understood that the resolutions of the image pyramid that provide information to the HPNN need not range from the absolute finest to the absolute coarsest. In other words, the HPNN may simply begin processing from some finer resolution relative to some coarser resolution.

Although the UOP error function is described above for training the HPNN structures of the present invention, an optional weight-decay regularizer is now described below to increase the performance of the HPNN structures. It should be noted that since the weight-decay regularizer increases the computational cost of a neural network system, the present weight-decay regularizer can be omitted if the above UOP trained HPNN performs adequately or if the computational cost is simply to high for a particular application.

As discussed above, the HPNNs of the present invention are trained using the UOP error function. The exact position or center of an object is usually ill-defined. Namely, it cannot be assigned to a particular pixel in a low-resolution image. Thus, the UOP error allows for this uncertainty.

To supplement the UOP error training, a weight-decay regularizer vis now described. In one embodiment, the regularization constant $\lambda$ at level 1 set equal to:

$$\lambda_1 = \lambda_L / 4^{L-1} \tag{41}$$

The layer index ranges from 0 to L, so there are L+1 levels. This regularizer is referred to as having a "level-dependent regularization constant". With this regularizer, the degree to which a weight is suppressed is less for weights further from the output layer. It has been observed that the hidden units at fine scales learned different weights, and the performance improved dramatically. Nevertheless, the choice is made only to prevent the initial gradient from suppressing those weights. In fact, the weights of the fine-scale hidden units or neurons become fairly large, because they eventually learn to contribute significantly to the network's output. When this stage of training is reached, the regularizer does not suppress these weights enough.

In an alternate embodiment, the regularization constant is weighted by a parameter such as the derivative of the error with respect to the layer's outputs. To implement this embodiment, the second derivative of the error is computed with respect to the layer's outputs, since the regularizer involves the first derivative. Computing the second derivatives is very complex and would require large amounts of memory. Thus, to reduce computational cost, the derivative can be replaced by an approximation that is much simpler.

The approximate regularizer of the present invention can be expressed as:

$$R(\lambda, w) = \frac{\lambda}{2} \sum_{l=0}^{L} \left( \frac{1}{4^{L-l}} \prod_{k=l+1}^{L} \|w^k\| \right) \|w^l\|^2 \tag{42}$$

The gradient of R is needed for training. It is:

$$\frac{\partial R}{\partial w_i^l} = \lambda \left\{ \left( \frac{1}{4^{L-l}} \prod_{k=l+1}^{L} \|w^k\| \right) + \frac{1}{2\|w^l\|^2} \sum_{l'=0}^{l-1} \left( \frac{1}{4^{L-l'}} \prod_{k=l'+1}^{L} \|w^k\| \right) \|w^{l'}\|^2 \right\} w_i^l \tag{43}$$

This regularizer is referred to as having a "weight-dependent regularization constant". The definitions for the above equations are as follows:

R is the regularizer.
$\lambda$ is the regularization constant.
k and l are indices over the levels in the HPNN.
L is the lowest-resolution level in the HPNN.
$w^l$ is a vector of all the parameters in level l. i.e., those in the network at level l. (similarly for $w^k$).

$w_i^l$ is the i-th parameter or weight in the network at level 1.

In another alternate embodiment, the regularizer is a bound on the absolute values of the weights. This does not suppress the weights in fine-scale layers early in (or at any time during) training, and still prevents the weights from becoming too large.

The implementation of bounds is achieved by using a sequential quadratic programming routine, e.g., from the commercial subroutine library of the Numerical Algorithms Group. This subroutine allows bounds (as well as linear and nonlinear constraints) on the parameters.

There are several benefits of using bounds. First, the regularizer is faster, since a variable on a bound is effectively removed from the optimization problem, thereby decreasing the dimensionality of the problem. Second, the significance of a given size of bound has some intuitive meaning, since a sigmoid is saturated to some degree when its input has a magnitude of about four (the inverse of the maximum slope). Given knowledge of the magnitude of the inputs, a bound of a given size can be interpreted. Input from hidden units in earlier layers, for example, is of order one, so bounds between one and ten might seem appropriate.

There has thus been shown and described a novel method and apparatus for learning and integrating features from multiple resolutions for detecting and/or classifying objects and for addressing supervised learning where there are potential errors in the training data. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. An architecture of a plurality of neural networks for processing an input signal that is decomposed into a plurality of resolution levels, said architecture comprising:

a first neural network for receiving input from a fine resolution level of said input signal;

a second neural network for receiving input from a coarse resolution level of said input signal; and a third neural network having an input layer for receiving input from a resolution level that is coarser than said fine resolution level and finer than said coarse resolution level of said input signal and for receiving inputs from an output layer of said first neural network and from an output layer of said second neural network.

2. An architecture of a plurality of neural networks for processing an input signal that is decomposed into a plurality of resolution levels, said architecture comprising:

a first neural network for receiving input from a fine resolution level of said input signal;

a second neural network for receiving input from a first intermediate resolution level that is coarser than said fine resolution level and for receiving input from said first neural network;

a third neural network for receiving input from said first intermediate resolution level and for receiving input from a neural network that is receiving input from a resolution level that is coarser than said first intermediate resolution level;

a fourth neural network for receiving inputs from a coarse resolution level of said input signal;

a fifth neural network for receiving input from a second intermediate resolution level that is finer than said coarse resolution level and for receiving input from said fourth neural network; and a sixth neural network for receiving input from said second intermediate resolution level and for receiving input from a neural network that is receiving input from a resolution level that is finer than said second intermediate resolution level.

3. The architecture of a plurality of neural networks of claim 2, further comprising:

a seventh neural network for receiving input from said second and said third neural networks; and an eighth neural network for receiving input from said fifth and said sixth neural networks.

* * * * *